(12) United States Patent
Washio et al.

(10) Patent No.: US 11,295,755 B2
(45) Date of Patent: Apr. 5, 2022

(54) STORAGE MEDIUM, SOUND SOURCE DIRECTION ESTIMATION METHOD, AND SOUND SOURCE DIRECTION ESTIMATION DEVICE

(71) Applicant: FUJITSU LIMITED, Kawasaki (JP)

(72) Inventors: Nobuyuki Washio, Akashi (JP); Masanao Suzuki, Yokohama (JP); Chisato Shioda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 16/532,188

(22) Filed: Aug. 5, 2019

(65) Prior Publication Data
US 2020/0051584 A1  Feb. 13, 2020

(30) Foreign Application Priority Data
Aug. 8, 2018 (JP) .............................. JP2018-149694

(51) Int. Cl.
*G10L 25/51* (2013.01)
*H04R 3/00* (2006.01)
(Continued)

(52) U.S. Cl.
CPC ............ *G10L 25/51* (2013.01); *G06F 40/263* (2020.01); *H04R 3/005* (2013.01); *H04R 5/04* (2013.01)

(58) Field of Classification Search
CPC ......... G10L 25/51; G10L 25/49; G10L 25/54; G06F 40/263; G06F 40/268; H04R 3/005; H04R 3/002; H04R 5/04
See application file for complete search history.

(56) References Cited

U.S. PATENT DOCUMENTS

2007/0271097 A1\* 11/2007 Abe .............................. 704/251
2008/0077387 A1\* 3/2008 Ariu ........................ G10L 15/22
704/3
(Continued)

FOREIGN PATENT DOCUMENTS

JP       2004-318026 A      11/2004
JP       2007322523 A  \*  12/2007
(Continued)

OTHER PUBLICATIONS

JP2007322523A—translation (Year: 2007).\*

*Primary Examiner* — Huyen X Vo
*Assistant Examiner* — Darioush Agahi
(74) *Attorney, Agent, or Firm* — Fujitsu Patent Cetner

(57) ABSTRACT

A non-transitory computer-readable storage medium storing a program that causes a processor included in a computer mounted on a sound source direction estimation device to execute a process, the process includes calculating a sound pressure difference between a first voice data acquired from a first microphone and a second voice data acquired from a second microphone and estimating a sound source direction of the first voice data and the second voice data based on the sound pressure difference, outputting an instruction to execute a voice recognition on the first voice data or the second voice data in a language corresponding to the estimated sound source direction, and controlling a reference for estimating a sound source direction based on the sound pressure difference, based on a time length of the voice data used for the voice recognition based on the instruction and a voice recognition time length.

9 Claims, 23 Drawing Sheets

(51) Int. Cl.
*H04R 5/04* (2006.01)
*G06F 40/263* (2020.01)

(56) References Cited

U.S. PATENT DOCUMENTS

| | | | | |
|---|---|---|---|---|
| 2014/0067386 A1* | 3/2014 | Zhang | ................ | G10L 21/0208 |
| | | | | 704/226 |
| 2019/0103110 A1* | 4/2019 | Kawano | ................ | G10L 15/32 |

FOREIGN PATENT DOCUMENTS

| JP | 2009-109868 A | | 5/2009 | | |
|---|---|---|---|---|---|
| JP | 2010-026220 A | | 2/2010 | | |
| JP | 4689107 B2 | * | 5/2011 | ............ | G06N 3/008 |
| JP | 5154363 B2 | * | 2/2013 | | |

* cited by examiner

STORAGE MEDIUM, SOUND SOURCE DIRECTION ESTIMATION METHOD, AND SOUND SOURCE DIRECTION ESTIMATION DEVICE

CROSS-REFERENCE TO RELATED APPLICATION

This application is based upon and claims the benefit of priority of the prior Japanese Patent Application No. 2018-149694, filed on Aug. 8, 2018, the entire contents of which are incorporated herein by reference.

FIELD

The embodiments discussed herein are, related to a storage medium, a sound source direction estimation method, and a sound source direction estimation device.

BACKGROUND

In a voice recognition device, which performs a voice recognition by inputting voice of a plurality of speakers, when languages of the plurality of speakers are different, a sound source (speaker) is estimated and a voice recognition is performed in a language according to the speaker. In order to estimate a sound source, for example, a technology of estimating a sound source by estimating a sound source direction using a plurality of directional microphones is used.

As a related technology, there has been proposed a voice translation device which includes a first microphone for picking up, voice in a first language and a second microphone for picking up voice in a second language.

As a related technology, there also has been proposed a technology for controlling an adaptation process of beam forming from speaker identification information and speaker direction information.

As a related technology, there also has been proposed a sound source localization device including two microphones, each having forward directivity and arranged with an interval to the left and right, one being directed forward and the other being directed backward.

Japanese Laid-open Patent Publication No. 2010-026220, Japanese Laid-open Patent Publication No. 2004-318026, Japanese Laid-open Patent Publication No. 2009-109868, and the like are examples of the related art.

However, the direction of the sound source with respect to the microphone may not be regular. For example, there may be a possibility that the direction of the sound source changes because the position of the face of the speaker changes due to the height, posture, or the like of the speaker. There may be another possibility that the direction of the sound source with respect to the microphone changes because the position of the microphone changes due to the thickness of the clothes of the person holding the microphone.

In view of the above, it is desirable to improve an estimation accuracy of the sound source direction.

SUMMARY

According to an aspect of the embodiments, a non-transitory computer-readable storage medium storing a program that causes a processor included in a computer mounted on a sound source direction estimation device to execute a process, the process includes calculating a sound pressure difference between a first voice data acquired from a first microphone and a second voice data acquired from a second microphone and estimating a sound source direction of the first voice data and the second voice data based on the sound pressure difference outputting an instruction to execute a voice recognition on the first voice data or the second voice data in a language corresponding to the estimated sound source direction, and controlling a reference for estimating a sound source direction based on the sound pressure difference, based on a time length of the voice data used for the voice recognition based on the instruction and a voice recognition time length.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Example of Overall Configuration of System of Embodiment

Figure 1:
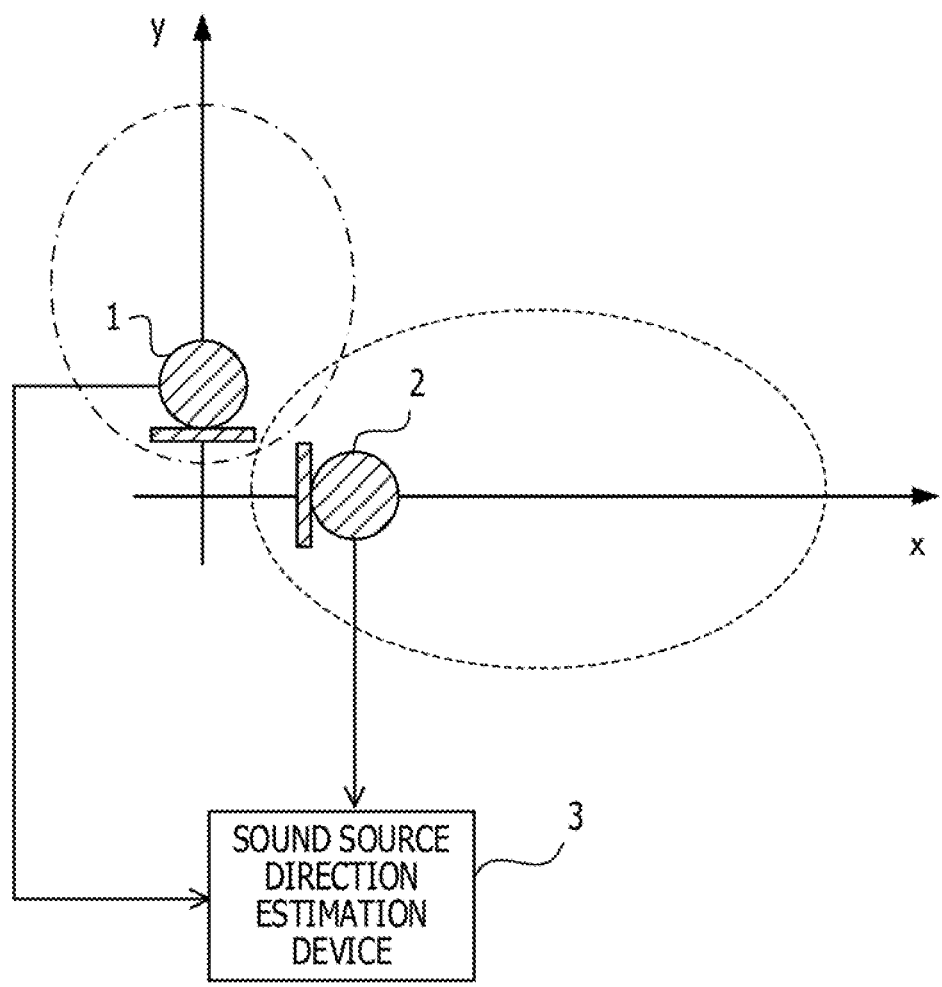
FIG. 1 is a diagram illustrating an example of cc configuration of a system of an embodiment.

Hereinafter, an embodiment will be described with reference to the drawings. FIG. 1 is a diagram illustrating an example of a configuration of a system of an embodiment. In FIG. 1, a first microphone 1 and a second microphone 2 having directivity, and a sound source direction estimation device 3 are, provided.

The first microphone 1 is installed to detect a sound propagating from a y direction. The second microphone 2 is installed to detect a sound propagating from an x direction. The first microphone 1 and the second microphone 2 convert input sounds into electric signals and output the electric signals to a sound source direction estimation device 3.

When there are a plurality of sound sources, the sound source direction estimation device 3 calculates a sound pressure difference between first voice, data acquired from the first microphone 1 and second voice data acquired from the second microphone 2, and specifies a sound source direction based on the sound pressure difference.

Figure 2:
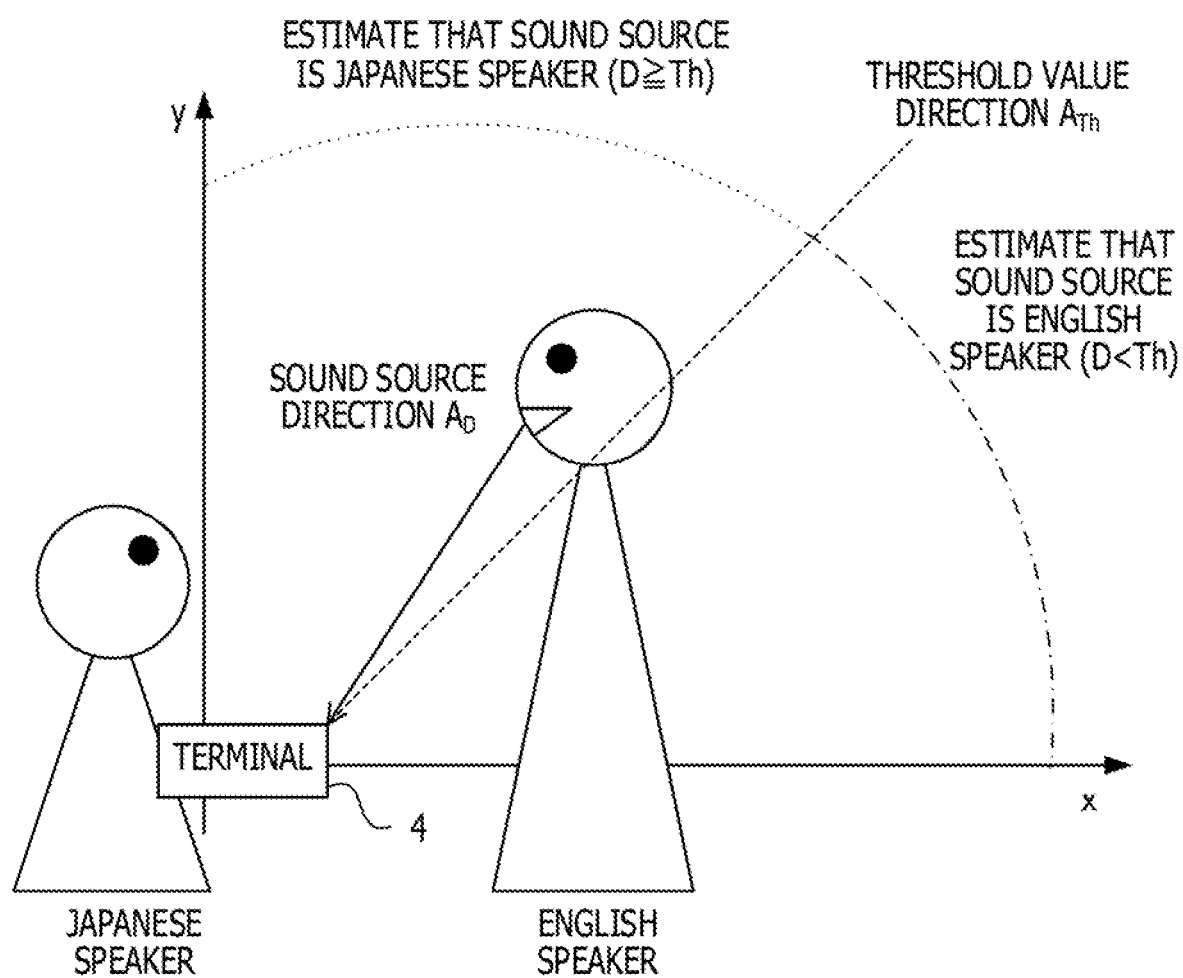
FIG. 2 is a diagram illustrating a first example in which an estimation of a sound source direction is incorrect.

FIG. 2 is a diagram illustrating a first example, in which an estimation of a sound source direction is incorrect. In the example in FIG. 2, a Japanese speaker and an English speaker talk face to face, and the Japanese speaker possesses a terminal 4. The terminal 4 includes the first microphone 1, the second microphone 2, and the sound source direction estimation device 3 illustrated in FIG. 1. FIG. 2 illustrates an example where an actual sound source is the English speaker but the sound source is incorrectly estimated to be the Japanese speaker.

In the example illustrated in FIG. 2, the sound source direction estimation device 3 calculates a sound pressure difference between a sound pressure P1 of voice data acquired from the first microphone and a sound pressure P2 of voice data acquired from the second microphone. The sound source direction estimation device 3 calculates a sound pressure difference D, for example, according to the following equation. D=P1−P2

The sound source direction estimation device 3 estimates that the Japanese speaker is a sound source when D≥Th using a preset threshold value Th, and estimates that the English speaker is a sound source when D<Th. The threshold value Th is a threshold value for determining a sound source direction of the first voice data and the second voice data, and an appropriate value is set in advance according to a relative position between the sound sources.

In FIG. 2, a direction corresponding to the sound pressure difference D is represented as a sound source direction $A_D$, and a direction corresponding to the threshold value Th is represented as a threshold value direction $A_{Th}$. In the sound source direction estimation device 3, it is assumed that the sound source direction $A_D$ is between the threshold value direction $A_{Th}$ and the y direction, when D≥Th. In this case, the sound source direction estimation device 3 estimates that the Japanese speaker is a sound source. It is assumed that the sound source direction $A_D$ is between the threshold value direction $A_{Th}$ and the x direction, when D<Th. In this case, the sound source direction estimation device 3 estimates that the English speaker is a sound source. For example, by appropriately setting the threshold value Th, it is possible to estimate whether a sound source is the English speaker or the Japanese speaker.

The terminal 4 performs a voice recognition in English and a translation from English into Japanese when the sound source is the English speaker. The terminal 4 performs a voice recognition in Japanese and a translation from Japanese into English when the sound source is the Japanese speaker. The terminal 4 may output an instruction to perform the voice recognition and the translation to another information process device (for example, a server).

In the example illustrated in FIG. 2, it is estimated that the sound source is the Japanese speaker although the actual sound source is the English speaker, since the equation becomes D≥Th as a result of the sound source direction estimation device 3 calculating the sound pressure difference D. For example, such an incorrect estimation may be performed when the height of the English speaker is higher than expected or when a distance between the Japanese speaker and the English speaker is closer than expected.

Figure 3:
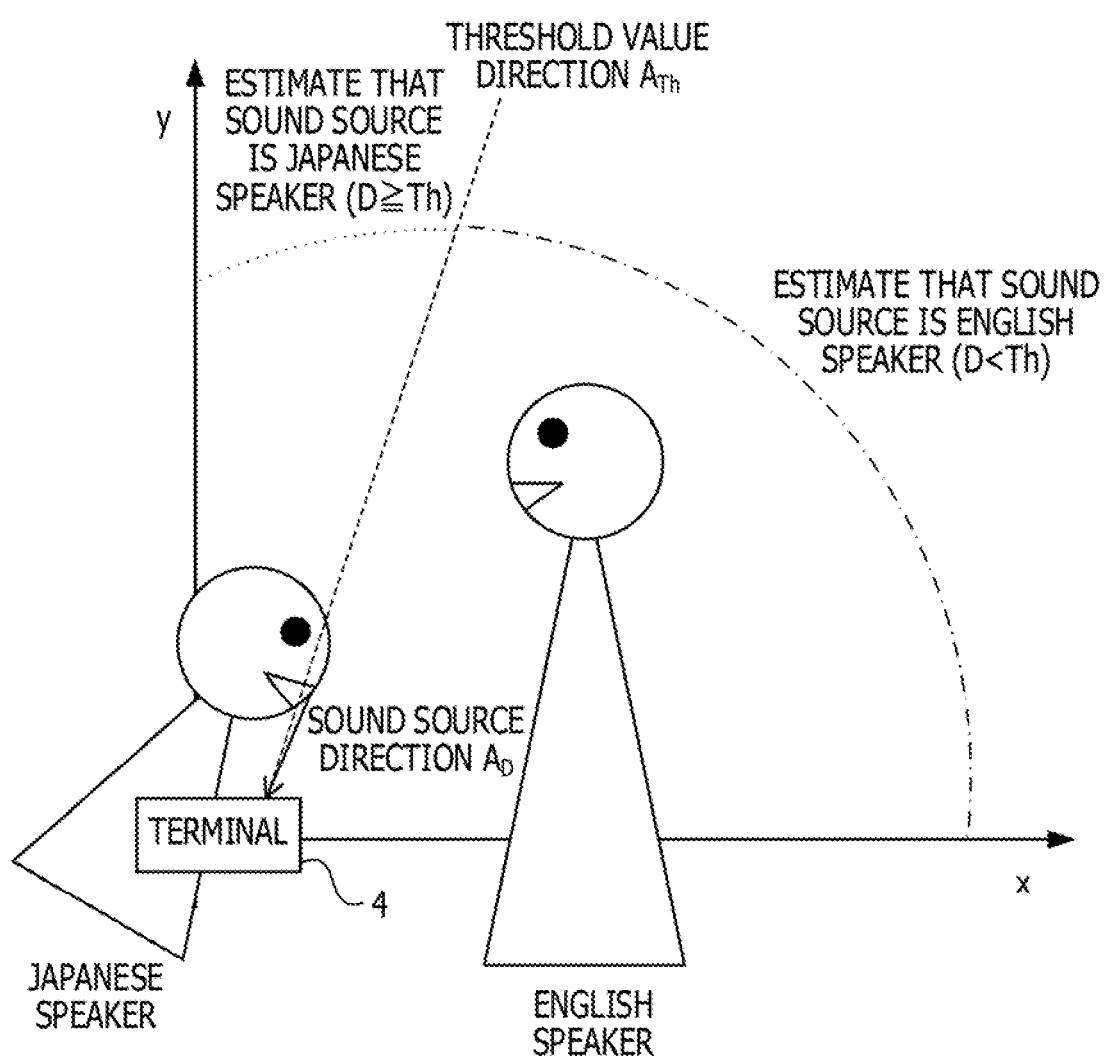
FIG. 3 is a diagram illustrating a second example in which an estimation of a sound source direction is incorrect.

FIG. 3 is a diagram illustrating a second example in which an estimation of a sound source is incorrect. As in FIG. 2, in FIG. 3, a direction corresponding to the sound pressure difference D is represented as a sound source direction $A_D$, and a direction corresponding to the threshold value Th is represented as a threshold value direction $A_{Th}$. FIG. 3 illustrates an example where an actual sound source is the Japanese speaker but the sound source is estimated to be the English speaker. In the example illustrated in FIG. 3, as in FIG. 2, the sound source direction estimation device 3 calculates a sound pressure difference D, estimates that the Japanese speaker is a sound source when D≥Th using the preset threshold value Th, and estimates that the English speaker is a sound source when D<Th.

In the example illustrated in FIG. 3, it is estimated that the sound source is the English speaker although the actual sound source is the Japanese speaker, since the equation becomes D<Th as a result of the sound source direction estimation device 3 calculating the sound pressure difference D. For example, such an incorrect estimation may be performed when the Japanese speaker speaks in stooped position.

As illustrated in the examples in FIG. 2 and FIG. 3, the sound source direction estimation device 3 may perform an incorrect estimation of a direction of the sound source when a position of the sound source is different from the assumed position. The direction of the sound source corresponds to a language of the sound source, and the voice recognition and the translation may be performed in an incorrect language. In addition to the examples illustrated in FIG. 2 and FIG. 3, the sound source direction estimation device 3 may perform an incorrect estimation of the sound source due to a mounting position of the terminal 4 and an influence of a reflection of the sound by the material of the clothes.

First Embodiment

Figure 4:
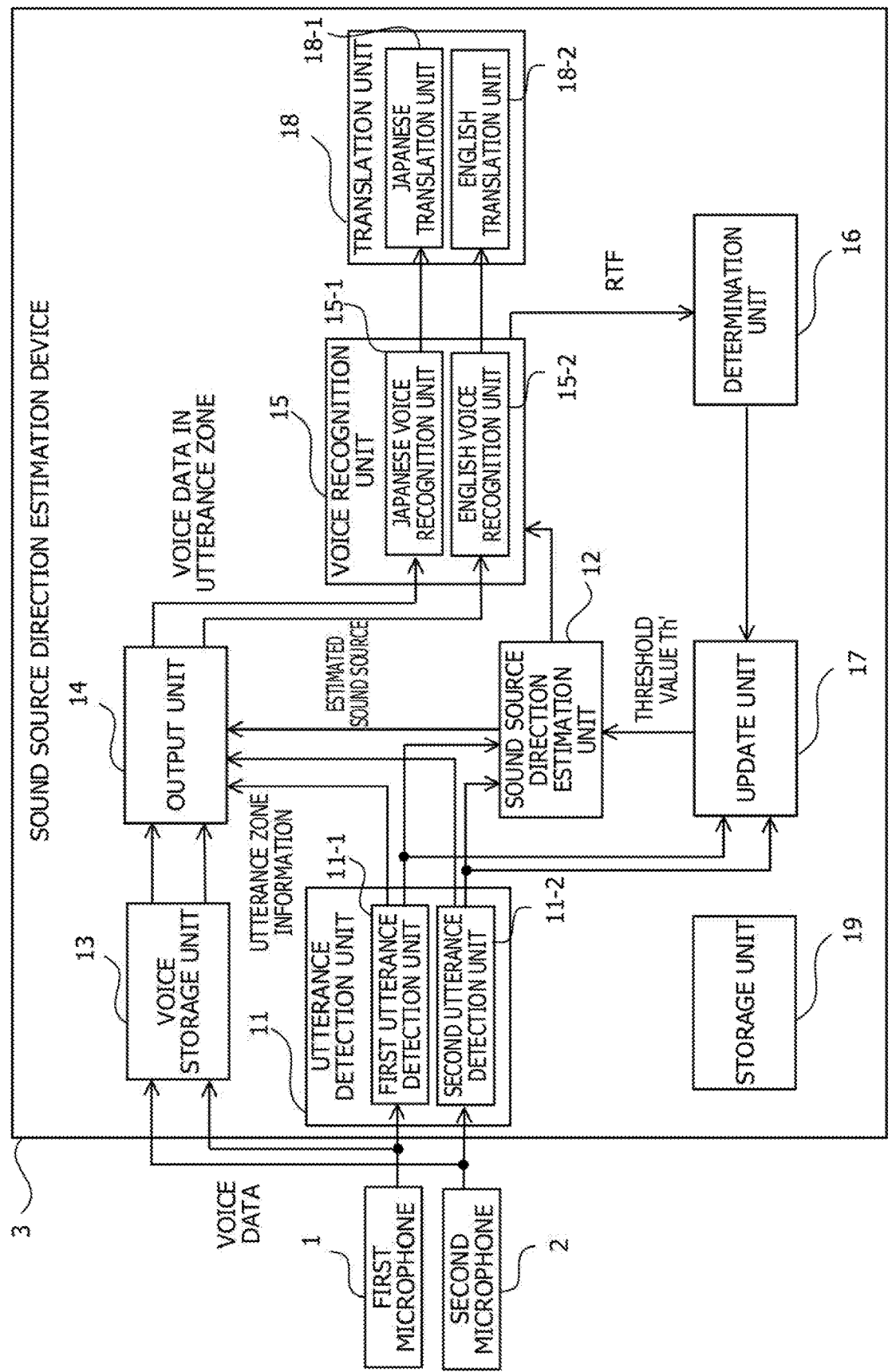
FIG. 4 is a functional block diagram illustrating a system of the embodiment.

FIG. 4 is a functional block diagram illustrating a system of an embodiment. The system of the embodiment includes a first microphone 1, a second microphone 2, and a sound source direction estimation device 3. The sound source direction estimation device 3 includes an utterance detection unit 11, a sound, source direction estimation unit 12, a voice storage unit 13, an output unit 14, a voice recognition unit 15, a determination unit 16 an update unit 17, a translation unit 18 and a storage unit 19.

The first microphone 1 and the second microphone 2 have directivity. For example, as illustrated in FIG. 1, the first microphone 1 and the second microphone 2 are installed to detect sounds in orthogonal directions.

The utterance detection unit 11 detects utterances in the first voice data acquired from the first microphone 1 and the second voice data acquired from the second microphone. The utterance detection unit 11 outputs utterance period information indicating an utterance period of the voice data and a sound pressure of each process frame. The details of the process of the utterance detection unit 11 will be described later.

The sound source direction estimation unit 12 acquires a sound pressure of the first voice data and a sound pressure, of the second voice data, as well as the utterance period information of the first voice data and the second voice data from the utterance detection unit 11. The sound source direction estimation unit 12 calculates a sound pressure difference between the first voice data acquired from the first microphone and the second voice data acquired from the second microphone based on the acquired sound pressures. Then, the sound source direction estimation unit 12 estimates sound source directions of the first voice data and the second voice data based on a comparison result of the sound pressure difference and the threshold value Th (first threshold value). Estimating the sound source direction corresponds to estimating a speaker who is a sound source and estimating a language of voice generated from the sound source.

For example, when a sound pressure difference obtained by subtracting the sound pressure of the second voice data from the sound pressure of the first voice data is equal to or larger than the threshold value Th, the sound source direction estimation unit 12 estimates that the voice is generated from first sound source present in a direction according to the directivity of the first microphone. The first sound source corresponds to the Japanese speaker in the example illustrated in FIGS. 2 and 3.

For example, when a sound pressure difference obtained by subtracting the sound pressure of the second voice data from the sound pressure of the first voice data is less than the threshold value Th, the sound source direction estimation unit 12 estimates that the voice is generated from a second sound source present in a direction corresponding to the directivity of the second microphone. The second sound source corresponds to the English speaker in the example illustrated in FIGS. 2 and 3.

The voice storage unit 13 stores the first voice data acquired from the first microphone and the second voice data acquired from the second microphone.

The output unit 14 acquires the first voice data and the second voice data, and outputs, to the voice recognition unit 15, an instruction to execute a voice recognition with respect to the first voice data or the second voice data in a language corresponding to the estimated sound source direction. For example, the output unit 14 selects voice data corresponding to an estimation result of the sound source direction estimation unit 12 out of the first voice data and the second voice data, and outputs, to the voice recognition unit 15, an instruction to execute a voice recognition in a language according to an estimation result of the sound source direction estimation unit 12 with respect to a part corresponding to the utterance period detected by the utterance detection unit 11 out of the selected voice data.

For example, when it is estimated that the voice is generated from the first sound source present in a direction according to the directivity of the first microphone, the output unit 14 outputs, to the voice recognition unit 15, an instruction to execute a voice recognition in a language corresponding to the first sound source with respect to the first voice data. When it is estimated that the voice is generated from the second sound source present a direction according to the directivity of the second microphone, the output unit 14 outputs, to the voice recognition unit 15, an instruction to execute a voice recognition in a language corresponding to the second sound source with respect to the second voice data.

In the example illustrated in FIGS. 2 and 3, when the output unit 14 receives an estimation result indicating that a sound source is the Japanese speaker, the output unit 14 outputs, to a Japanese voice recognition unit 15-1, the first voice data and an instruction to execute a voice recognition in Japanese. When the output unit 14 receives an estimation result indicating that a sound source is the English speaker, the output unit 14 outputs, to an English voice recognition unit 15-2, the second voice data and an instruction to execute a voice recognition in English.

The voice recognition unit 15 acquires a sound source estimation result from the sound source direction estimation unit 12, acquires any one of the first voice data and the second voice data from the output unit 14, and executes a voice recognition of the acquired voice data. In the examples illustrated in FIGS. 2 and 3, when it is estimated that the sound source is the Japanese speaker and the first voice data is acquired, the Japanese voice recognition unit 15-1 corresponding to Japanese executes a voice recognition. For example, when it is estimated that the sound source is the English speaker and the second voice data is acquired, the English voice recognition unit 15-2 corresponding to English executes a voice recognition.

The voice recognition unit 15 calculates a real time factor (RTF) indicating a ratio of process time of a voice recognition (hereinafter referred to as a voice recognition time length) to a time length of input voice data (hereinafter referred to as a voice input time length). The voice input time length is a time length of voice data which is detected as an utterance from the input sound and is input to the voice recognition unit. For example, the voice recognition unit 15 calculates the RTF as the following equation. RTF=voice recognition time length/voice input time length.

The determination unit 16 receives the RTF from the voice recognition unit 15, compares the RTF with a preset threshold value ThR (second threshold value), and outputs a comparison result to the update unit 17. The threshold value ThR is a threshold value for determining whether the language of the first voice data or the second voice data to be input to the voice recognition is different from the language corresponding to the sound source direction.

Based on the RTF of the voice data used for the voice recognition, the update unit 17 controls a reference for estimating the sound source direction which is based on the sound pressure difference. For example, when the RTF is larger than the threshold value ThR in the determination result of the determination unit 16, the update unit 17 updates the threshold value Th. This is because when the RTF is larger than the threshold value ThR, the estimation of a sound source is considered to be incorrect. The update unit 17 outputs the updated threshold value Th' to the sound source direction estimation unit 12. Then, the sound source direction estimation unit 12 uses the updated threshold value Th' in the next estimation of the sound source direction.

The translation unit 18 performs translation process using a process result of the voice recognition unit 15. The translation unit 18 performs translation process of different languages according to an estimation result of the sound source direction estimation unit 12. For example, when it is estimated that the sound source is Japanese, a Japanese translation unit 184 translates from Japanese to a specified language. When it is estimated that the sound source is English, an English translation unit 18-2 translates from English to a specified language. When the language of the estimated sound source is the same as the specified language, the translation unit 18 may not perform a translation.

The translation unit 18 outputs a translation process result. For example, the translation unit 18 may cause a display device to display the translation process result, or may transmit the translation process result to an information process terminal or the like used by a user.

The storage unit 19 stores various data used for process of the sound source direction estimation device 3. The storage unit 19 stores, for example, the threshold value Th and threshold value ThR set in advance, and a relationship of the language and the microphone corresponding to the estimation result of the sound source direction.

Either one or both of the voice recognition unit 15 and the translation unit 18 may be included in a device (for example, a server) different from the sound source direction estimation device 3. For example, the process of the embodiment is realized by transmitting and receiving various information between a terminal including the first microphone 1, the second microphone 2, and the sound source direction estimation device 3, and a server including the voice recognition unit 15 and the translation unit 18.

Figure 5:
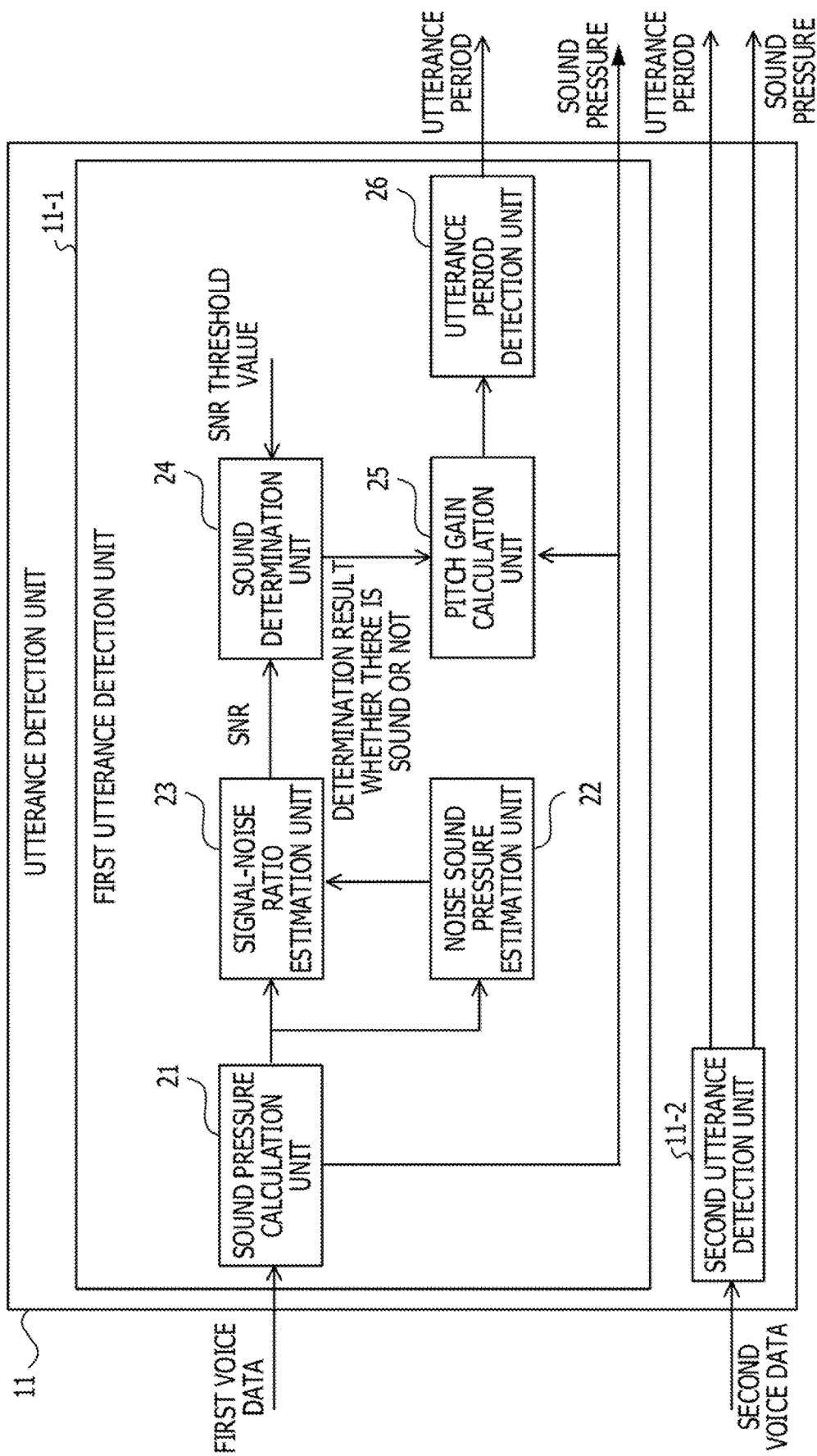
FIG. 5 is a diagram illustrating an example of a configuration of an utterance detection unit.

FIG. 5 is a diagram illustrating an example of a configuration of an utterance detection unit 11. FIG. 5 illustrates the detailed configuration of the utterance detection unit 11-1, and it is assumed that the configuration of the utterance detection unit 11-2 is also the same. The utterance detection unit 11-1 includes a sound pressure calculation unit 21, a noise sound pressure estimation unit 22, a signal-noise ratio estimation unit 23, a sound determination unit 24, a pitch gain calculation unit 25, and an utterance period detection unit 26. Hereinafter, the signal-noise ratio may be described as an SNR.

The utterance detection unit 11 inputs voice data and executes utterance detection process on a frame basis. A frame length is set to, for example, 10 msec to 20 msec. The utterance detection unit 11 divides the voice data into each set frame length and performs process.

The sound pressure calculation unit 21 calculates a sound pressure of the voice data on a frame basis. Then, the sound pressure calculation unit 21 outputs the calculated sound pressure to the noise sound pressure estimation unit 22 and the signal-noise ratio estimation unit 23. The noise sound pressure estimation unit 22 calculates an estimated noise component in the voice data for each frame.

The signal-noise ratio estimation unit 23 calculates the SNR based on the sound pressure of the voice data input from the sound pressure calculation unit 21 and the noise sound pressure input from the noise sound pressure estimation unit 22.

The sound determination unit 24 compares the SNR input from the signal-noise ratio estimation unit 23 with a preset SNR threshold value, and determines that there is a sound when the SNR is equal to or larger than the SNR threshold value. Then, the sound determination unit 24 outputs a determination result indicating whether the voice data has a sound or no-sound to the pitch gain calculation unit 25.

The pitch gain calculation unit 25 calculates a pitch gain representing a strength of the periodicity of the sound for each frame included in a sound zone, and outputs the pitch gain to an utterance period detection unit 26.

The utterance period detection unit 26 compares the pitch gain with a threshold value for an utterance period detection for each frame in the sound zone, and detects an utterance period. For example, the utterance period detection unit 26 detects a timing when the pitch gain is equal to or larger than the first pitch gain threshold value as a start timing of the utterance period indicating a zone where the speaker is uttering, in a state in which a no-utterance period, where the speaker is not uttering, continues. The utterance period detection unit 26 detects a timing when the pitch gain is less than the second pitch gain threshold value which is smaller than the first pitch gain threshold value as an end timing of the utterance period, in a state in which an utterance period continues.

The utterance period detection unit 26 outputs the utterance period information. For example, when a frame is the utterance period start timing, the utterance period detection unit 26 outputs a determination result indicating that the frame is the utterance period start timing as an utterance period information. When a frame is the utterance period end timing, the utterance period detection unit 26 outputs a determination result indicating that the frame is the utterance period end timing as an utterance period information.

Figure 6:
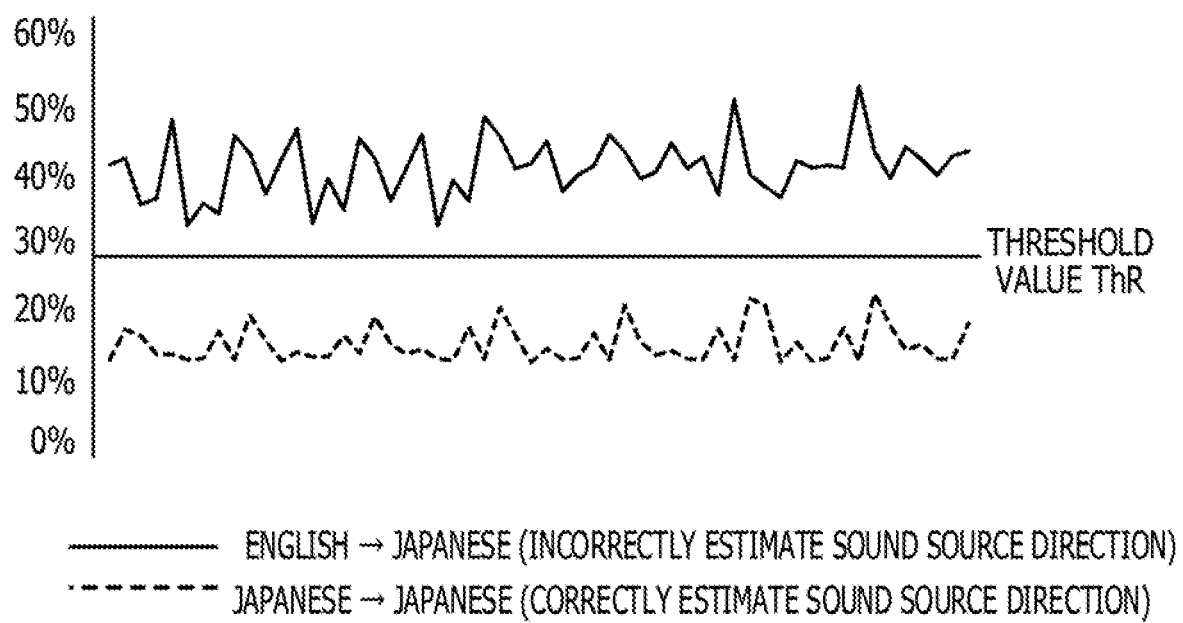
FIG. 6 is a-diagram illustrating an example of a measurement result of an RTF.

FIG. 6 is a diagram illustrating an example of a measurement result of an RTF. FIG. 6 illustrates the measurement result of the RTF when a preliminary experiment is performed on 56-time utterances. The RTF is process time of the voice recognition with respect to the length of voice input time (utterance time) as described above. When the language of the input voice and the corresponding language of the voice recognition are different, the RTF becomes larger because the process time of the voice recognition is longer than when the language of the input voice and the corresponding language of the voice recognition match.

A broken line in FIG. 6 indicates the RTF when the input voice is Japanese and the corresponding language of the voice recognition is Japanese (when the estimation of the sound source is correct). A solid line in FIG. 6 indicates the RTF when the input voice is English and the corresponding language of the voice recognition is English (when the estimation of the sound source is incorrect). For example, when the sound source direction estimation unit 12 incorrectly estimates the sound source direction and determines that the voice of the Japanese speaker is input even though the voice of the English speaker is actually input, the Japanese voice recognition unit 15-1 corresponding to Japanese executes a voice recognition.

As illustrated in the example of FIG. 6, when the estimation of the sound source is incorrect, the RTF has a higher value than when the estimation of the sound source is correct. Therefore, the determination unit 16 determines that the estimation of the sound source is incorrect when the RTF is equal to or larger than the predetermined threshold value ThR, and determines that the estimation of the sound source is correct when the RTF is less than the predetermined threshold value ThR.

Figure 7:
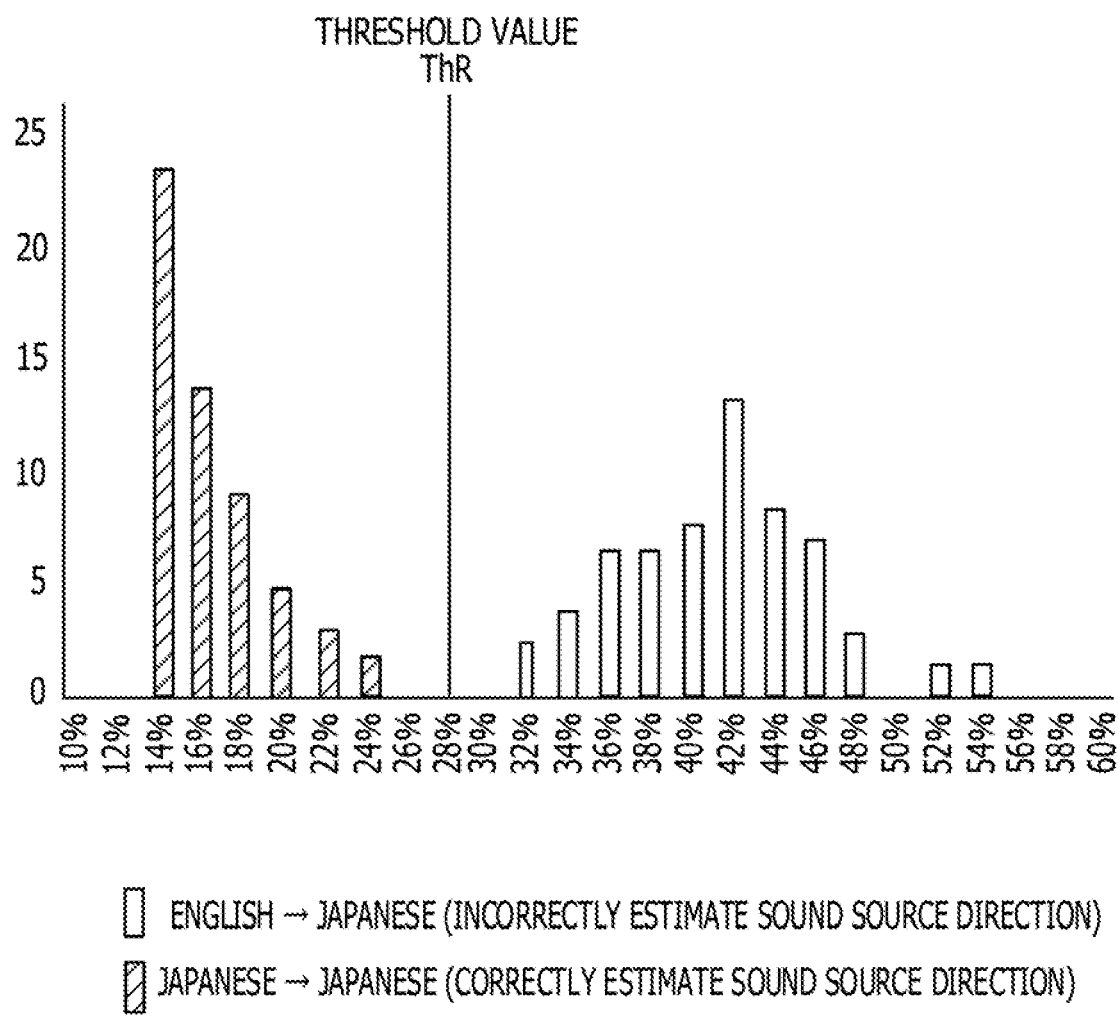
FIG. 7 is a diagram illustrating a first example of a setting method of a threshold value.

FIG. 7 is a diagram illustrating a first example of a setting method of a threshold value ThR. A histogram illustrated in FIG. 7 indicates a distribution of RTF values calculated for voice data input in the preliminary experiment. In the example illustrated in FIG. 7, RTF values in a case of correctly estimating the sound source exists in a region of 24% or less, and a distribution of RTF values in a case of incorrectly estimating the sound source are distributed in a region of 32% or more. In this case, the threshold value ThR is set to 28%, which is an intermediate value between 24% and 32%.

For example, when the distribution of the RTF values when the sound source is correctly estimated and the distribution of the RTF values when the sound source is incorrectly estimated do not overlap, the threshold value ThR is set to an intermediate value between the maximum value of the RTF value when the sound source is correctly estimated and the minimum value of the RTF value when the sound source is incorrectly estimated.

Figure 8:
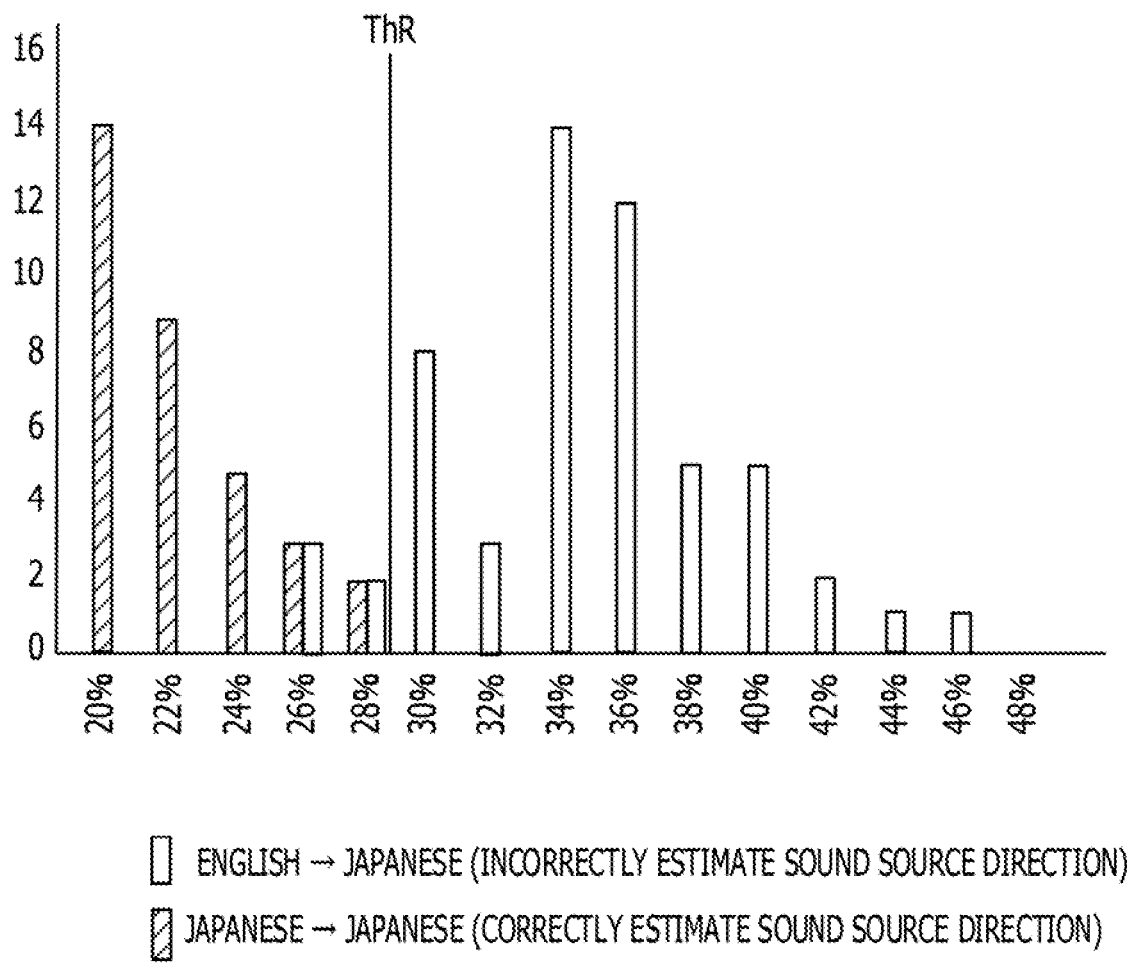
FIG. 8 is a diagram illustrating a second example of the setting method of a threshold value.

FIG. 8 is a diagram illustrating a second example of the setting method of a threshold value ThR. A histogram illustrated in FIG. 8 indicates a distribution of RTF values calculated for voice data input in the preliminary experiment. In the example illustrated in FIG. 8, RTF values when the sound source is correctly estimated exist in a region of 28% or less, and a distribution of RTF values when the sound source is incorrectly estimated are distributed in a region of 26% or more. In the example illustrated in FIG. 8, the threshold value ThR is set to 28% which is the maximum value of the RTF value when the sound source is correctly estimated.

For example, when the distribution of the RTF values when the sound source is correctly estimated and the distribution of the RTF values when the sound source is incorrectly estimated overlap, the threshold value ThR is set to the maximum value of the RTF value when the sound source is correctly estimated. The RTF values larger than 28% in the example illustrated in FIG. 8 is the RTF values when the sound source is incorrectly estimated. Therefore, by setting the threshold value ThR as in the second example, it is possible to suppress the possibility that the determination unit 16 determines that the estimation of the sound source direction is incorrect even though the sound source direction estimation unit 12 estimates the sound source direction correctly.

The ThR illustrated in FIGS. 6 to 8 is a ThR (referred to as ThR1) used when the sound source direction estimation unit 12 estimates that the sound source is the Japanese speaker. A ThR (referred to as ThR2) used when the sound source direction estimation unit 12 estimates that the sound source is the English speaker is also set in the same manner. The ThR2 is preset as in FIGS. 6 to 8 by using the distribution of the RTF when the input voice is Japanese and the corresponding language of voice recognition is English, and the distribution of the RTF when the input voice is English and the corresponding language of the voice recognition is English.

Figure 9:
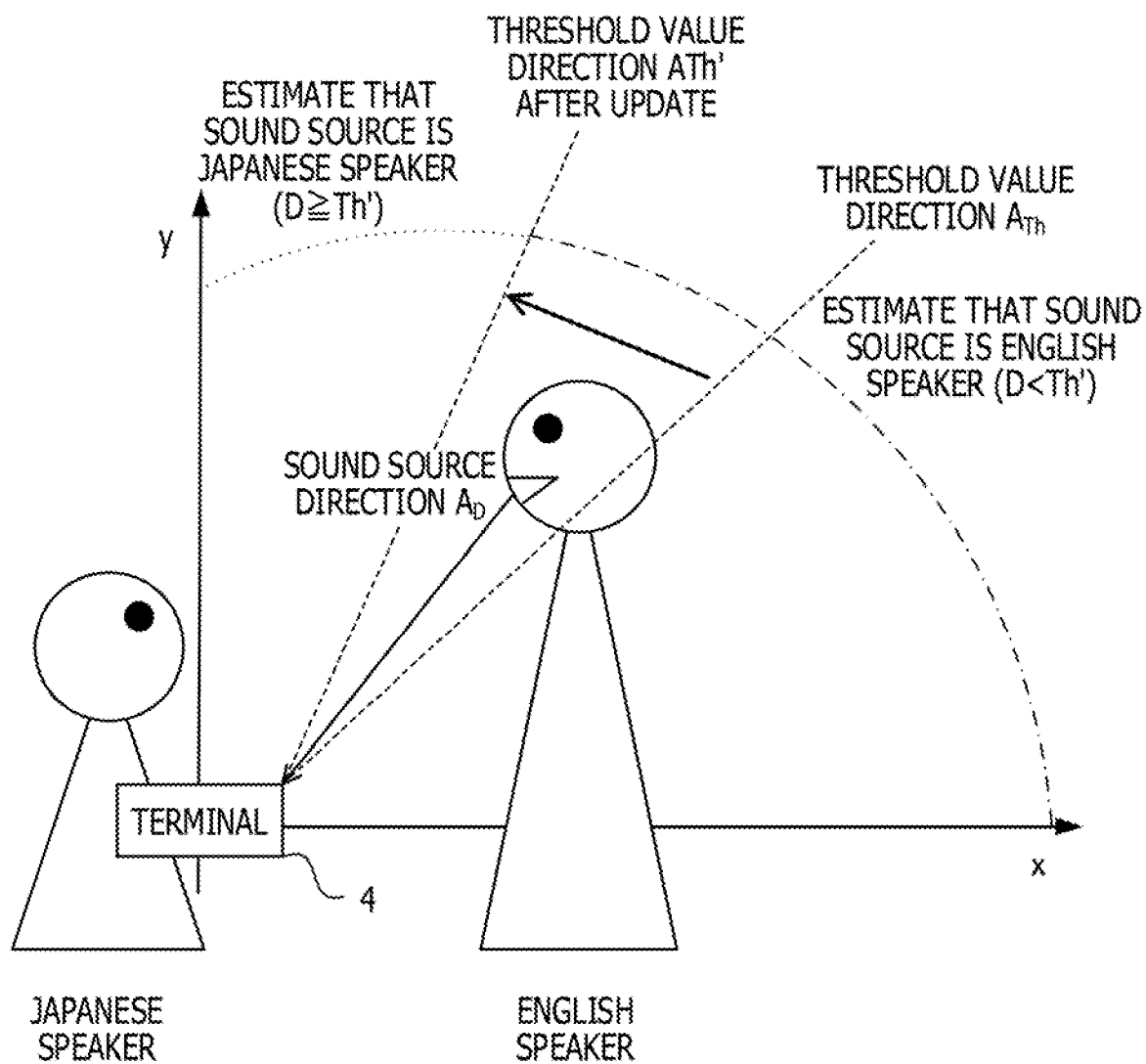
FIG. 9 is a diagram illustrating a first example of an updating method of a threshold value.

FIG. 9 is a diagram illustrating a first example of an updating method of a threshold value Th. As the example illustrated in FIG. 2, FIG. 9 illustrates an example of the updating method of the threshold value Th when it is incorrectly estimated that the sound source is the Japanese speaker even though the sound source is actually the English speaker. As in FIGS. 2 and 3 in FIG. 9, a direction corresponding to the sound pressure difference D is represented as a sound source direction $A_D$, and a direction corresponding to the threshold value Th is represented as a threshold value direction $A_{Th}$.

When the determination unit 16 determines that the estimation of the sound source is incorrect, the update unit 17 updates the threshold value Th. In the example illustrated in FIG. 2, although D≥Th, since the actual sound source is the English speaker, by updating the threshold value Th so that the equation becomes D<Th' (Th' is the updated threshold value), it can be correctly estimated that the sound source direction is the direction set as the English speaker is present. For example, it may be estimated that the speaker wearing the terminal 4 is the Japanese speaker, and the speaker without the terminal 4 is the English speaker.

Therefore, the update unit 17 adds a predetermined update amount m to the threshold value Th to obtain the updated threshold value Th'. As illustrated in FIG. 9, when the update unit 17 updates the threshold value Th to the threshold value Th', the threshold value direction $A_{Th}$ changes to a threshold value direction $A_{Th'}$. When the sound source direction estimation unit 12 performs a re-estimation using the updated threshold value Th', it can be correctly estimated that the sound source is the English speaker because the equation becomes D<Th'.

Figure 10:
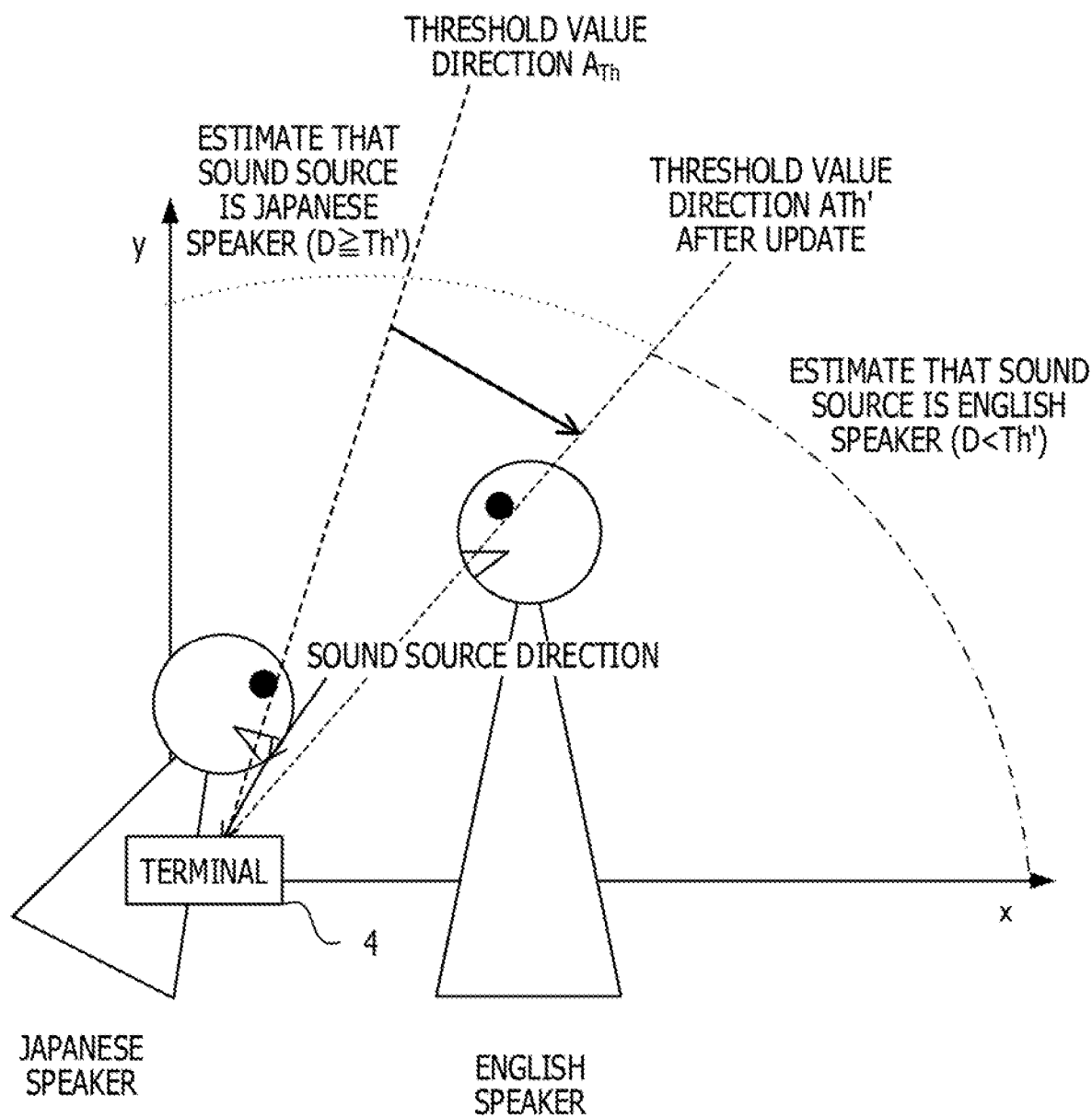
FIG. 10 is a diagram illustrating a second example of the updating method of a threshold value.

FIG. 10 is a diagram illustrating a second example of the updating method of a threshold value Th. As the example illustrated in FIG. 3, FIG. 10 illustrates an example of the updating method of the threshold value Th when it is incorrectly estimated that the sound source is the English speaker even though the sound source is actually the Japanese speaker.

When the determination unit 16 determines that the estimation of the sound source is incorrect, the update unit 17 updates the threshold value Th. In the example illustrated in FIG. 3, although D<Th, since the actual sound source is the Japanese speaker, by updating the threshold value Th so that the equation becomes D≥Th' (Th is the updated threshold value), it can be correctly estimated that the sound source is the Japanese speaker.

Therefore, the update unit 17 subtracts a predetermined update amount m from the threshold value Th to obtain the updated threshold value Th'. As illustrated in FIG. 10, when the update unit 17 updates the threshold value Th to the threshold value Th', the threshold value direction $A_{Th}$ changes to the threshold value direction $A_{Th'}$. When the sound source direction estimation unit 12 performs an estimation again using the threshold value Th', it can be correctly estimated that the sound source is the Japanese speaker because the equation becomes D≥Th'.

Figure 11:
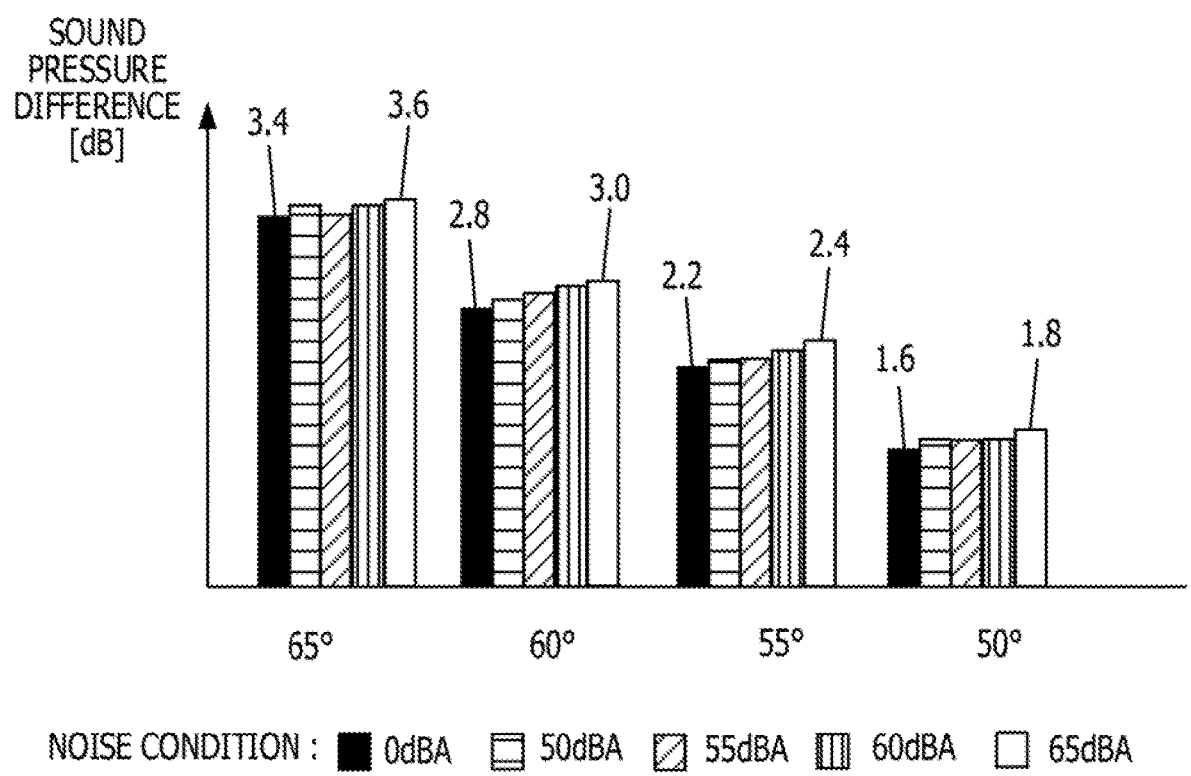
FIG. 11 is a diagram illustrating an example of a sound pressure difference for each sound source direction under a plurality of noise conditions.

FIG. 11 is a diagram illustrating an example of a sound pressure difference for each sound source direction under a plurality of noise conditions. In the example of FIG. 11, there are five noise conditions of 0 dBA, 50 dBA, 55 dBA, 60 dBA, and 65 dBA. FIG. 11 illustrates an example of a sound pressure difference for each sound source direction under these noise conditions. The sound pressure difference corresponds to the sound source direction, and as illustrated in FIG. 11, changes slightly according to a noise level.

The sound source direction estimation unit 12 sets the update amount m of the threshold value Th based on the difference in sound pressure difference under the plurality of noise conditions. In the example illustrated in FIG. 11, in all sound source directions, a difference between the maximum value and the minimum value of the sound pressure difference is 0.2 dB. Therefore, the update unit 17 uses 0.2 dB for the update amount m when updating the threshold value Th.

The sound source direction estimation device 3 can reduce the possibility of incorrectly estimating the sound source due to an influence of the noise by using the difference of the sound, pressure difference due to the noise conditions as the update amount m when updating the threshold value Th.

Figure 12:
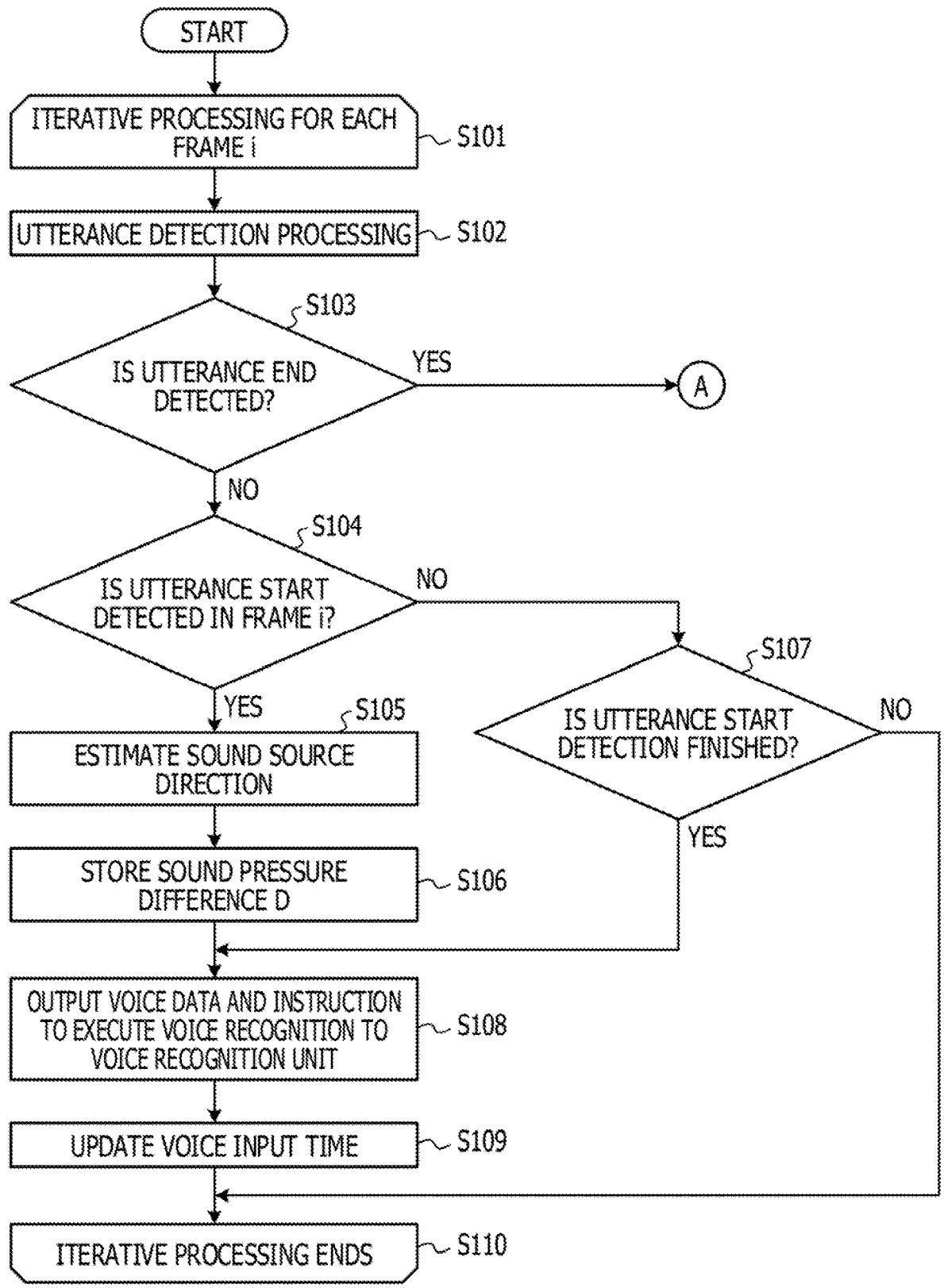
FIG. 12 is a flowchart (part 1) illustrating an example of process of a first embodiment.
Figure 13:
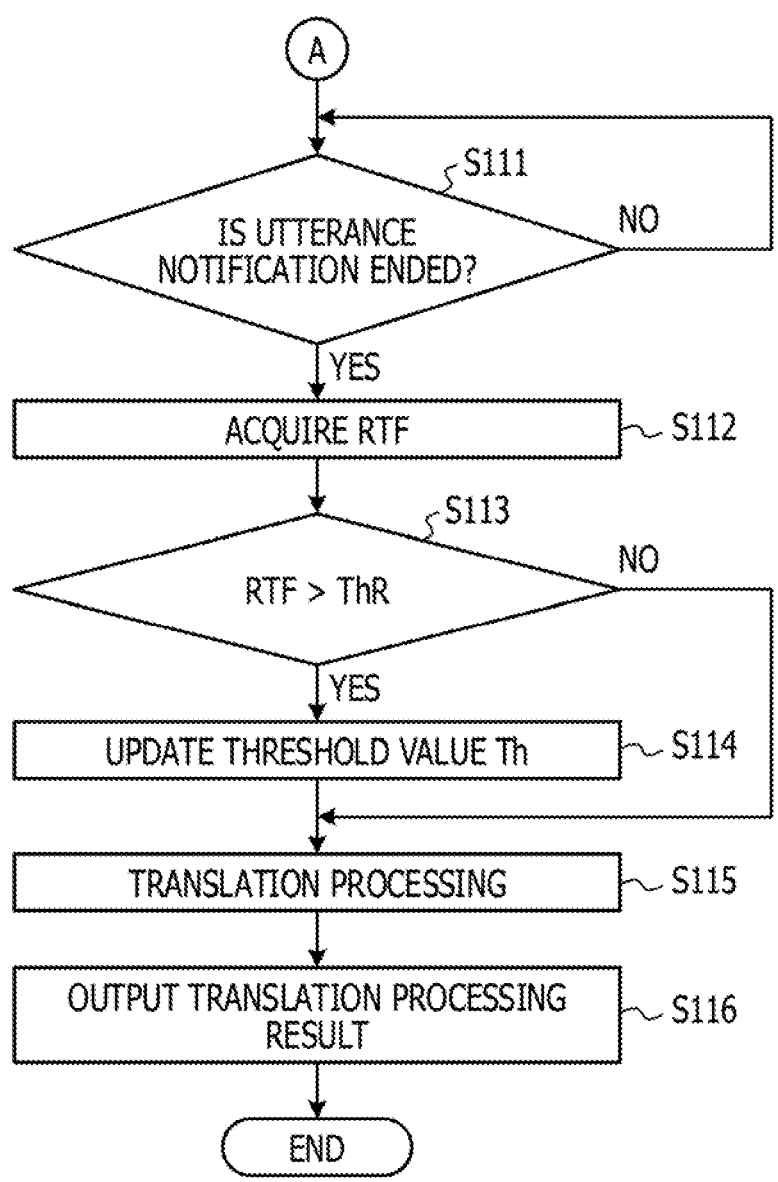
FIG. 13 is a flowchart (part 2) illustrating the example of the process of the first embodiment.

FIGS. 12 and 13 are flowcharts illustrating an example of process of the first embodiment. The sound source direction estimation device 3 starts iterative process for each frame for the input voice data (step S101). The frame number used for the iterative process is set to i. The sound source direction estimation device 3 executes the iterative process on each of the first voice data acquired from the first microphone 1 and the second voice data acquired from the second microphone. When the sound source direction is estimated in step S105, the sound source direction estimation device 3 executes the iterative process only on the voice data from the microphone whose directivity is directed to the direction of the estimated sound source.

The utterance detection unit 11 executes utterance detection process on the input voice data (step S102). The utterance detection unit 1 determines whether an utterance end is detected in a frame i (step S103). When the utterance end is not detected in the frame i (NO in step S103), the utterance detection unit determines whether an utterance start is detected in the frame i (step S104).

When the utterance start is detected in the frame i (YES in step S104), the sound source direction estimation unit 12 calculates a sound pressure difference D between the first voice data and the second voice data based on a sound pressure output from the utterance detection unit 11, and estimates a sound source direction based on a comparison result of the sound pressure difference and the first threshold value (step S105). The sound source direction estimation unit 12 stores the sound pressure difference D calculated in step S104 in the storage unit 19 (step S106).

When the utterance start is not detected in the frame i (NO in step S104), the utterance detection unit 11 determines whether the utterance start detection is finished until frame i−1 (step S107).

After the process the step S106, or in a case of YES in step S107, the output unit 14 outputs, to the voice recognition unit 15, an instruction to execute a voice recognition with the first voice data or the second voice data based on the estimation result of the sound source (step S108).

The voice recognition unit 15 executes voice recognition process on the voice data input in step S108 in parallel with the process in steps S101 to S110. The voice recognition unit 15 recognizes a voice of the input voice data in a language corresponding to the estimated sound source. For example, when it is estimated that the sound source is Japanese, the Japanese voice recognition unit 15-1 executes a voice recognition, and when it is estimated that the sound source is English, the English voice recognition unit 15-2 executes a voice recognition. When an utterance end is detected, the voice recognition unit 15 may perform an end utterance notification. When the end utterance notification is received from the voice recognition unit 15, the process proceeds to step S111 in FIG. 13.

The voice recognition unit 15 updates a voice input time length used for an RTF calculation according to a time length of the input voice data (step S109). For example, the voice recognition unit 15 adds time per frame to the voice input time length used for the RTF calculation. After process the step S109 or in a case of NO in step S107, the process relating to the frame i ends.

When the utterance end is detected by the utterance detection unit 11 (YES in step S103), the process proceeds to step S111 in FIG. 13.

The determination unit 16 stands by until the voice recognition of the voice recognition unit 15 ends, and when the voice recognition of the voice recognition unit 15 ends (YES in step S111), the determination unit 16 acquires the RTF from the voice recognition unit 15 (step S112).

The determination unit 16 determines whether the RTF is larger than the preset ThR (step S113). When the RTF is larger than the preset ThR (YES in step S113), the update unit 17 updates the threshold value Th (step S114). This is because when the RTF is larger than the preset threshold value ThR, the estimation of a sound source is considered to be incorrect. The update unit 17 sets D m to the updated threshold value Th' when the equation is D≥Th in the estimation process of the sound source. For example, the update unit 17 increases the threshold value Th. The update unit 17 sets D−m to the updated threshold value Th' when the equation is D<Th in the estimation process of the sound source. For example, the update unit 17 decreases the threshold value Th.

When NO at step S113, or after process the step S114, the translation unit 18 performs translation process using a process result of the voice recognition unit 15 (step S115). The translation unit 18 outputs a translation process result (step S116). The translation unit 18 may perform voice composition process.

As described above, when the RTF is larger than the threshold value ThR, the sound source direction estimation device 3 determines that the estimation of the sound source is incorrect, and since the threshold value Th used for the estimation of the sound source is updated, an estimation accuracy can be improved in the estimation of the sound source thereafter.

Second Embodiment

In a second embodiment, an example in which an average of the sound pressure differences in all the frames is calculated and the calculated average value is used in updating the threshold value, will be described. A configuration of the sound source direction estimation device 3 in the second embodiment is assumed to be the same as the configuration of the first embodiment illustrated in FIG. 4.

Figure 14:
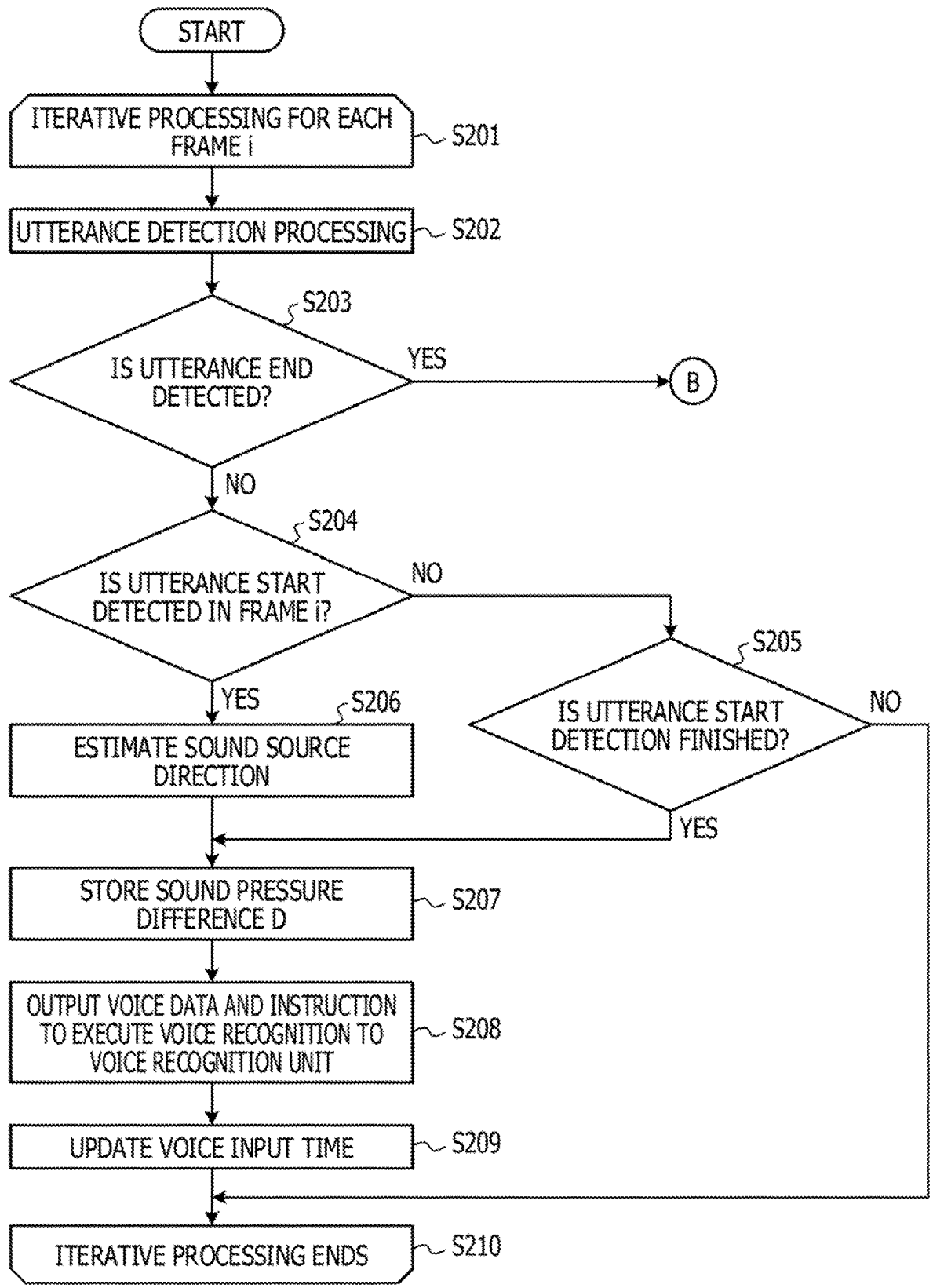
FIG. 14 is a flowchart (part 1) illustrating an example process of a second embodiment.
Figure 15:
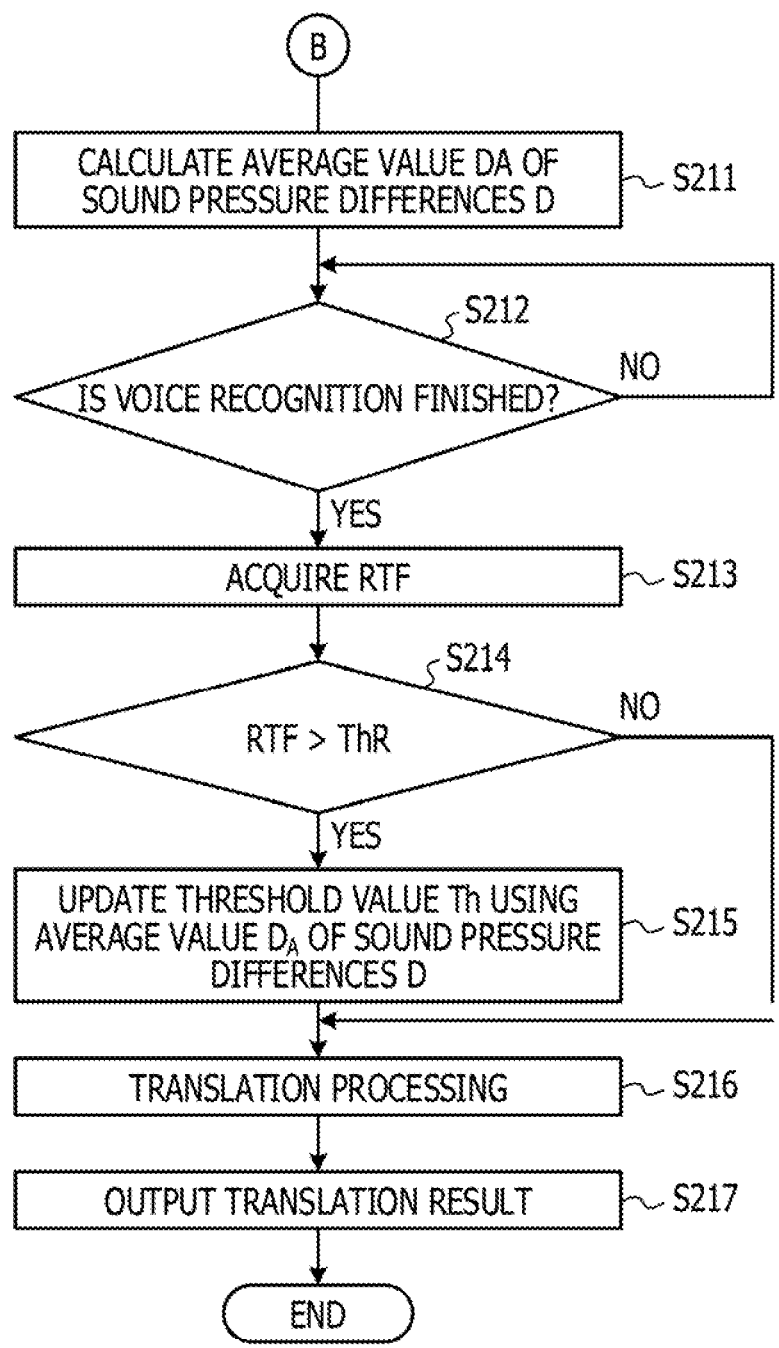
FIG. 15 is a flowchart (part 2) illustrating the example of the process of the second embodiment.

FIGS. 14 and 15 are flowchart illustrating an example of process of the second embodiment. Regarding the process of the second embodiment, parts different from the process of the first embodiment illustrated in FIGS. 12 and 13 will be described.

In FIG. 14, when it is determined whether the utterance start detection is finished (YES in step S205), the sound source direction estimation unit 12 stores the sound pressure difference in the frame i in the storage unit 19 (step S207). For example, in the first embodiment, the sound source direction estimation device 3 stores only the sound pressure difference of the frame in which the utterance start is detected, but in the second embodiment, the sound source direction estimation device 3 calculates and stores the sound pressure difference for each of a plurality of frames. The plurality of frames are, for example, frames of a predetermined zone from the beginning of the utterance period, or all frames in the utterance period.

The sound source direction estimation unit 12 calculates an average value $D_A$ of the sound pressure differences D in the plurality of stored frames (step S211).

When the RTF is larger than the preset ThR (YES in step S214), the update unit 17 updates the threshold value Th (step S214) based on the average value $D_A$ of the sound pressure differences D. For example, the update unit 17 sets $D_A$+m to the updated threshold value Th' when the equation is $D_A$≥Th in the estimation of the sound source direction. The update unit 17 sets $D_A$−m to the updated threshold value Th' when the equation is $D_A$<Th in the estimation of the sound source direction.

The sound pressure difference may change over time due to the influence of a noise or the like. Therefore, the sound source direction estimation device 3 in the second embodiment can further improve an accuracy of the sound source estimation process thereafter by using the average value of the sound pressure differences of all the frames for updating the threshold value Th.

Third Embodiment

In a third embodiment, an example in which a threshold value is updated when a difference between the sound pressure difference and the threshold value is within a predetermined value, will be described. A configuration of the sound source direction estimation device 3 in the third embodiment is assumed to be the same as the configuration of the first embodiment illustrated in FIG. 4.

Figure 16:
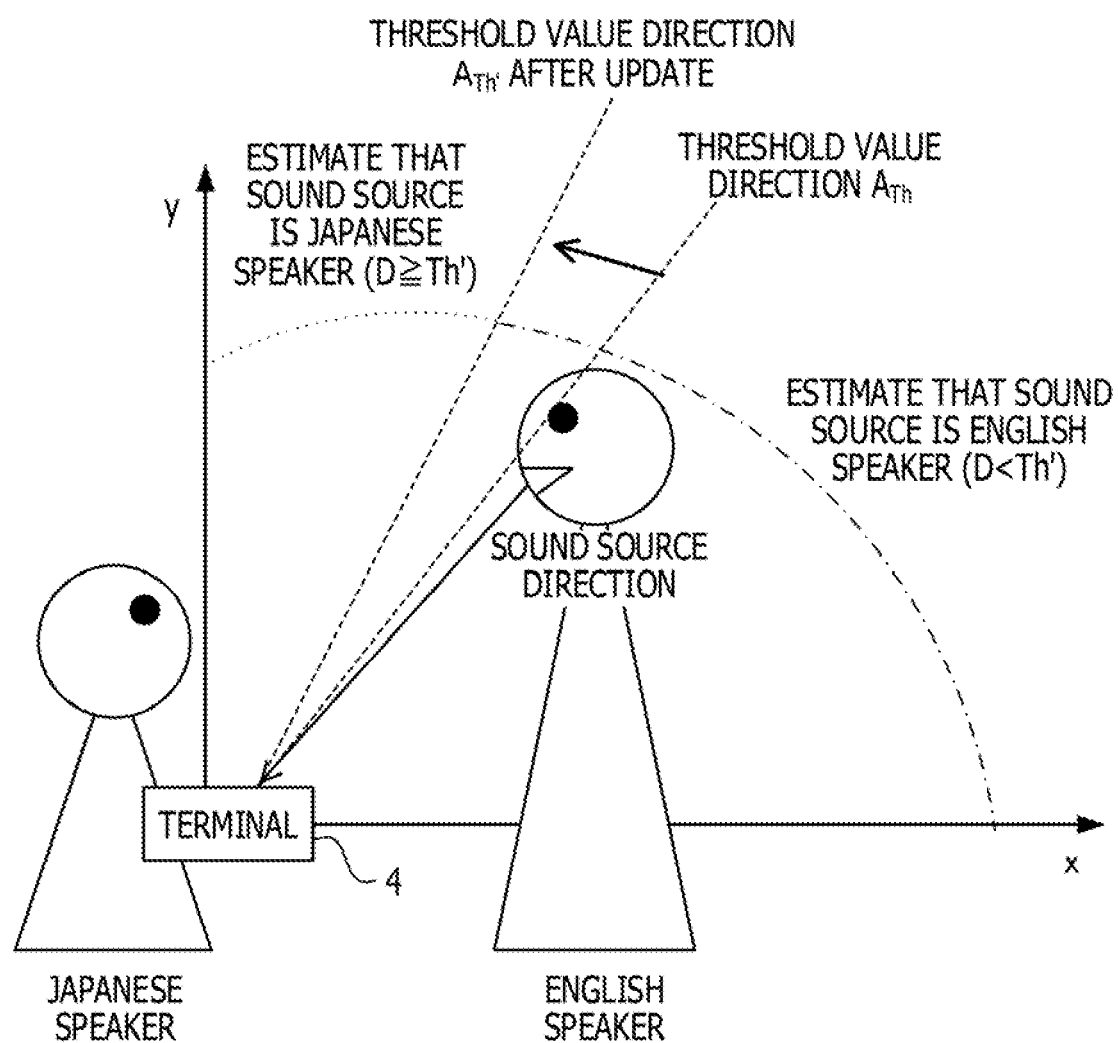
FIG. 16 is a diagram illustrating a third example of the updating method of a threshold value.

FIG. 16 is a diagram illustrating a third example of the updating method of a threshold value Th. FIG. 16 illustrates an example where D<Th, and the sound source direction estimation unit 12 estimates that the sound source is the English speaker and the estimation is correct. In that case, the determination unit 16 determines whether a difference between the sound pressure difference D and the threshold value Th is equal to or less than a predetermined value n. Then, when the difference between the sound pressure difference D and the threshold value Th is equal to or less than the predetermined value n, the update unit 17 updates the threshold value Th so that the difference between the sound pressure difference D and the threshold value Th becomes large. The equation may be as follows, predetermined value n=update amount m.

As in the example illustrated in FIG. 16, when the equation is D<Th and the difference between the sound pressure difference D and the threshold value Th is equal to or less than the predetermined value n, the update unit 17 uses the sound pressure difference D and the update amount m and calculates the updated threshold value Th' as in the following equation. Th'=D+m.

Figure 17:
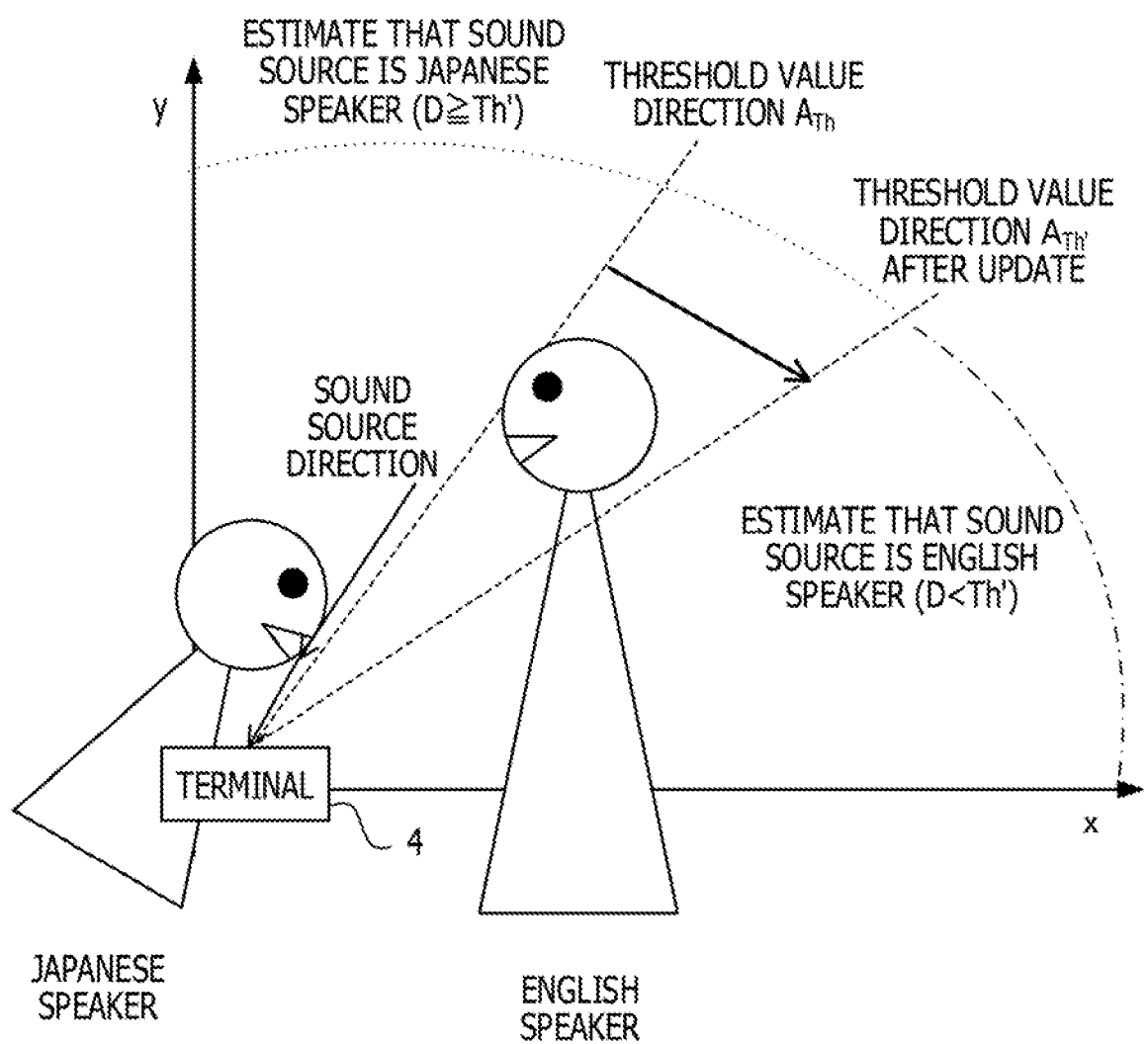
FIG. 17 is a diagram illustrating a fourth example of the updating method of a threshold value.

FIG. 17 is a diagram illustrating a fourth example of the updating method of the threshold value Th. FIG. 17 illustrates an example where D≥Th, and the sound source direction estimation unit 12 estimates that the sound source is the Japanese speaker and the estimation is correct. In that case, the determination unit 16 further determines whether a difference between the sound pressure difference D and the threshold value Th is equal to or less than the predetermined value n. Then, when the difference between the sound pressure difference D and the threshold value Th is equal to or less than the predetermined value n, the update unit 17 updates the threshold value Th so that the difference between the sound pressure difference D and the threshold value Th becomes large.

As in the example illustrated in FIG. 17, when the equation is D≥Th and the difference between the sound pressure difference D and the threshold value Th is equal to or less than the predetermined value n, the update unit 17 uses the sound pressure difference D and the update amount m and calculates the updated threshold value Th' as in the following equation. Th'=D−m.

Figure 18:
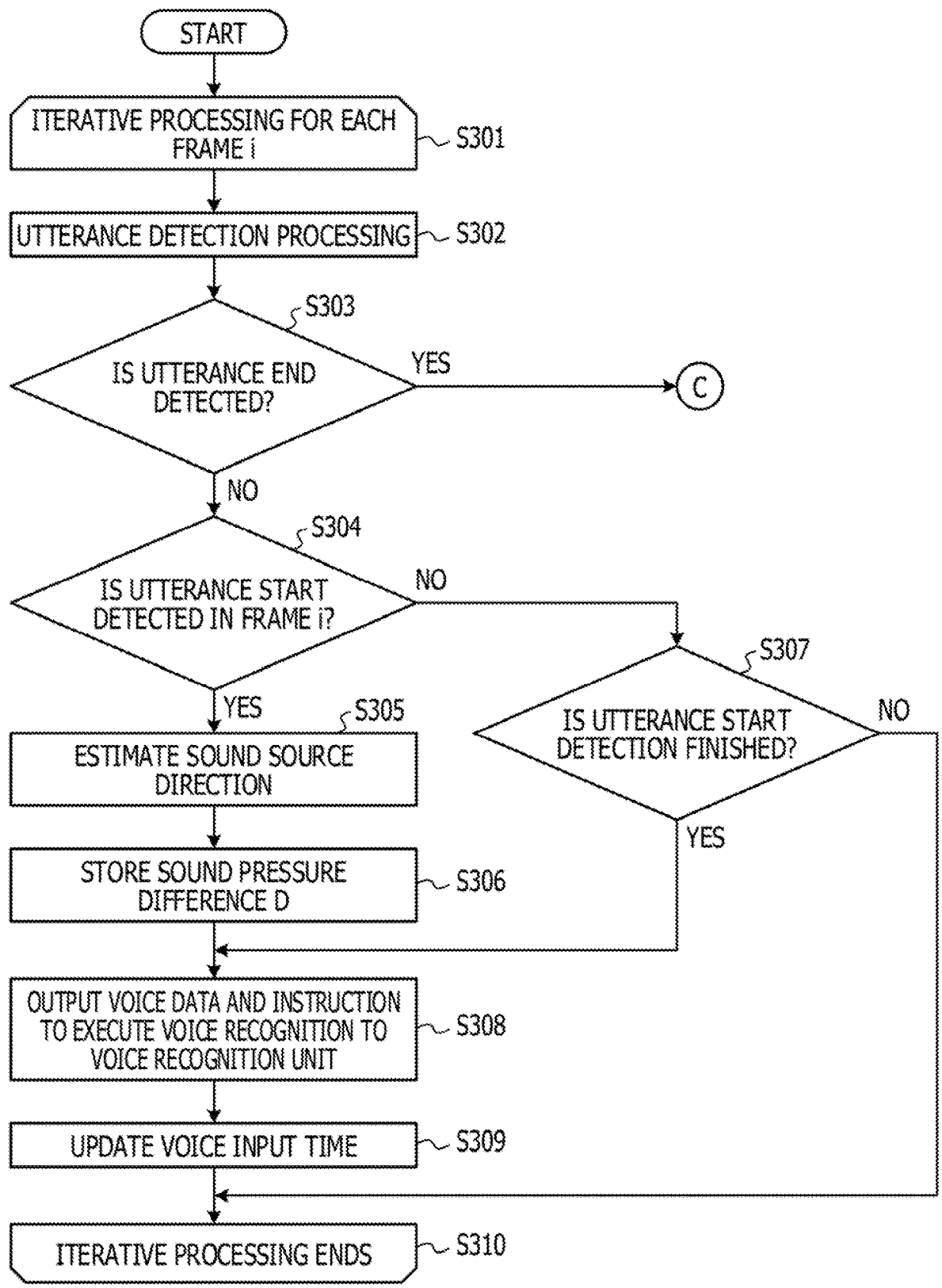
FIG. 18 is a flowchart (part 1) illustrating an example of process of a third embodiment.
Figure 19:
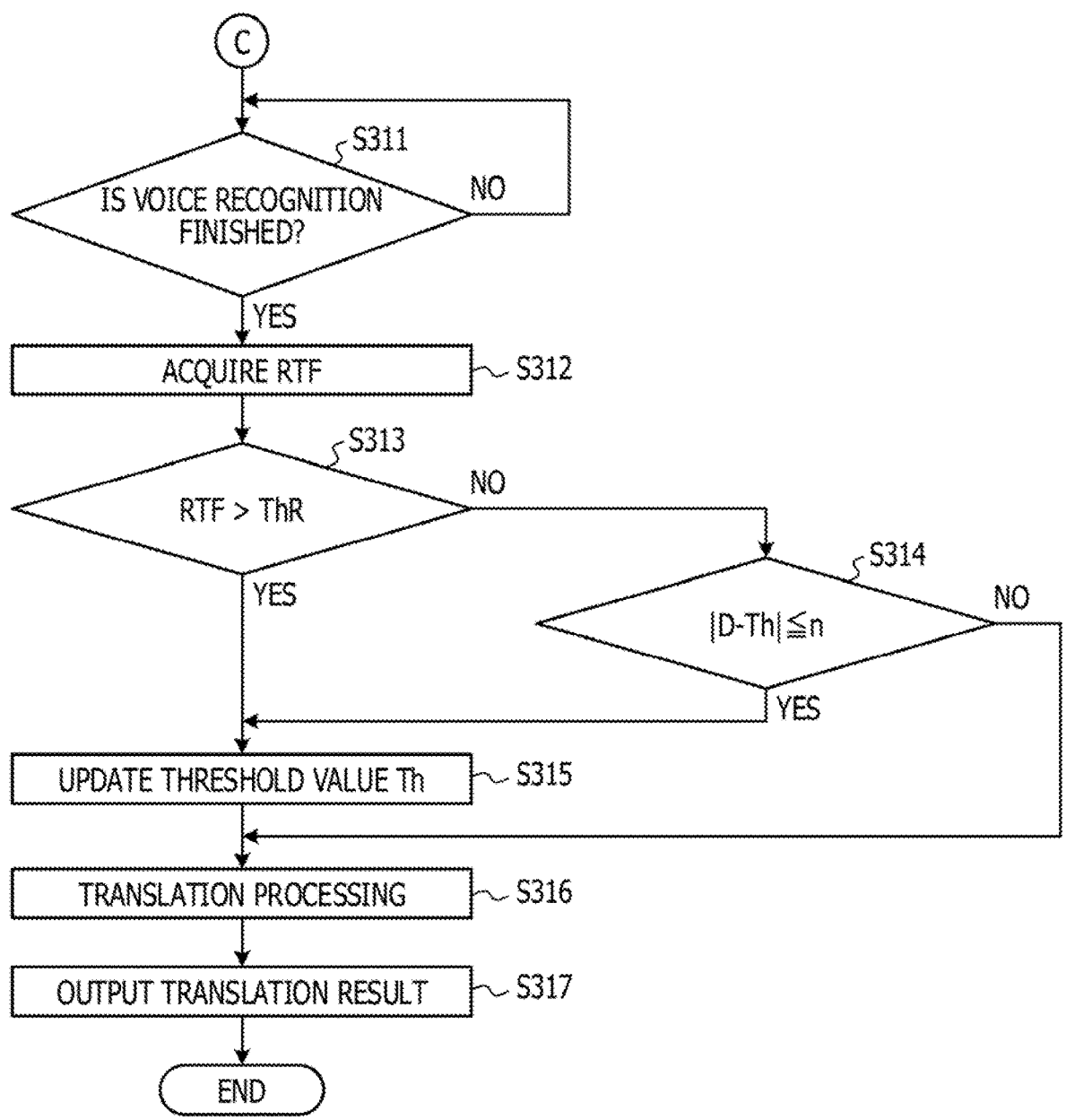
FIG. 19 is a flowchart (part 2) illustrating the example of the process of the third embodiment.

FIGS. 18 and 19 are flowcharts illustrating an example of process of the third embodiment. Regarding the process of the third embodiment, parts different from the process of the first embodiment illustrated in FIGS. 12 and 13 will be described.

In FIG. 19, the determination unit 16 determines whether the RTF is larger than the preset ThR (step S313). When NO in step S313, for example, when it is determined that the estimation result of the sound source direction is correct, the determination unit 16 determines whether the difference between the sound pressure difference D and the threshold value Th is equal to or less than the predetermined value n (step S314).

When YES in step S314, the update unit 17 updates the threshold value Th so that the difference between the sound pressure difference D and the threshold value Th becomes large (step S315). For example, as in the example illustrated in FIG. 16, when the equation is D<Th and the difference between the sound pressure difference D and the threshold value Th is equal to or less than the predetermined value n, the update unit 17 adds the update amount m to the sound pressure difference D, and sets the added result as the updated threshold value Th'. As in the example illustrated in FIG. 17, when the equation is D≥Th and the difference between the sound pressure difference D and the threshold value Th is equal to or less than the predetermined value n, the update unit 17 subtracts the update amount m from the sound pressure difference D, and sets the subtracted result as the updated threshold value Th'.

Even if the estimation of the sound source is correct, when the sound pressure difference and the threshold value are close, it is considered that there is a possibility that the estimation of the sound source direction may be incorrect due to a subsequent change in noise or the like. Therefore, in the third embodiment, when the difference between the sound pressure difference and the threshold value is within the predetermined value, the sound source direction estimation device 3 can further improve an estimation accuracy of the sound source direction by updating the threshold value Th so as to increase the difference between the sound pressure difference and the threshold value.

Fourth Embodiment

In the fourth embodiment, an example in which a voice recognition is performed in a language corresponding to a sound source different from the estimated sound source when the RTF is larger than a value ThR3, which is equal to or larger than the ThR, will be described. A configuration of the sound source direction estimation device 3 in the fourth embodiment is assumed to be the same as the configuration of the first embodiment illustrated in FIG. 4.

Figure 20:
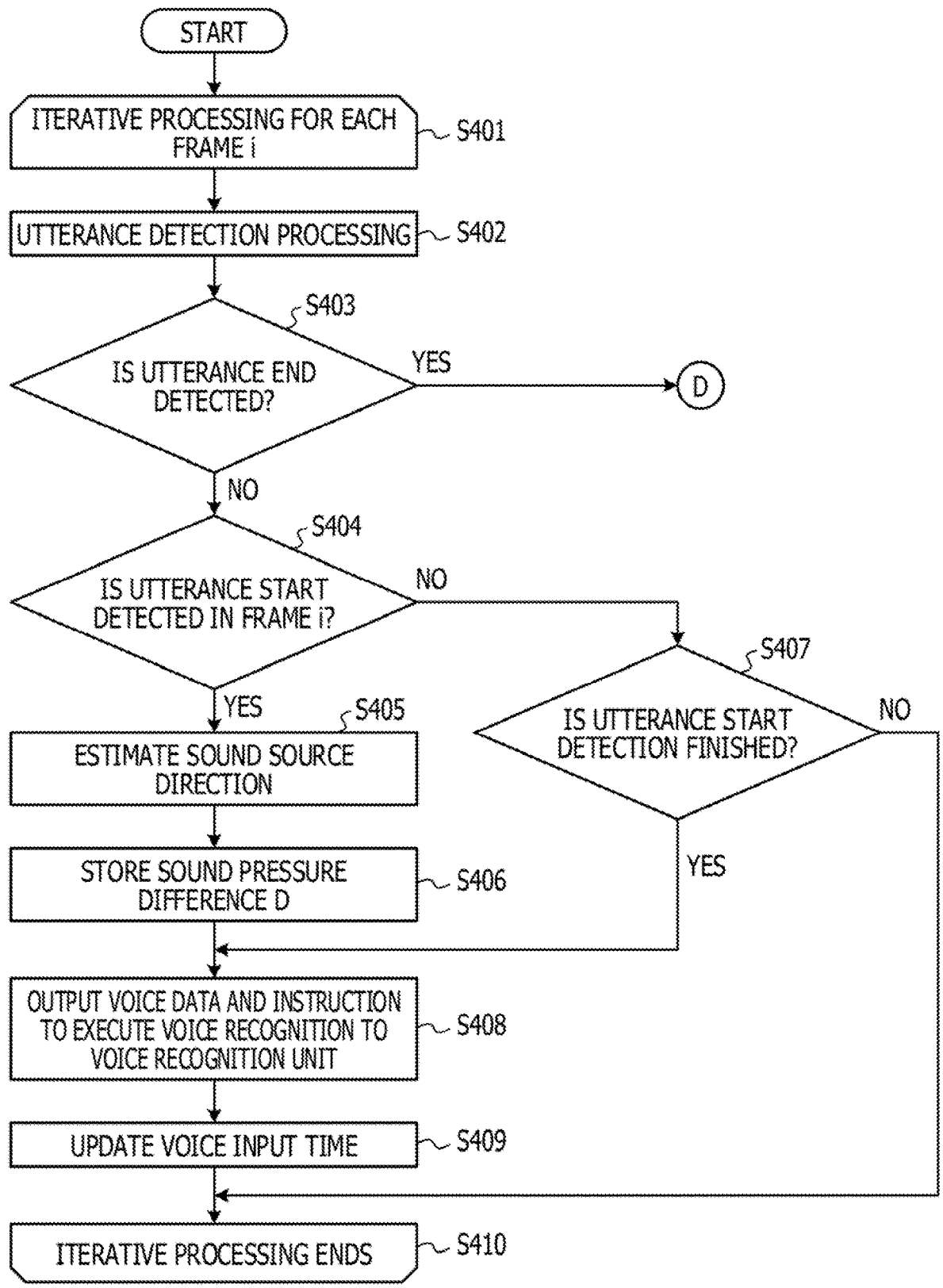
FIG. 20 is a flowchart (part 1) illustrating an example of process of a fourth embodiment.
Figure 21:
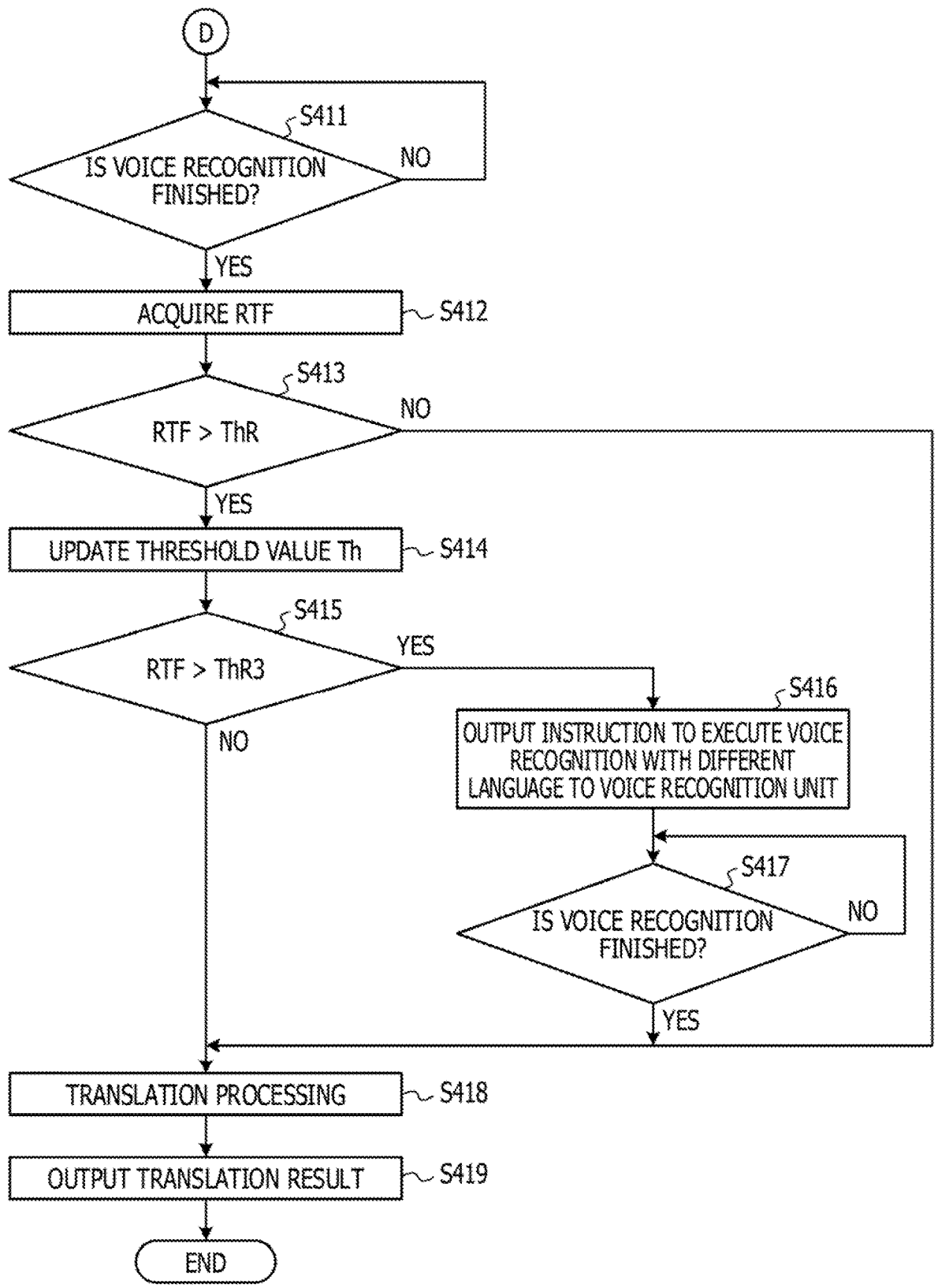
FIG. 21 is a flowchart (part 2) illustrating the example of the process of the fourth embodiment.

FIGS. 20 and 21 are flowcharts illustrating an example of process of the fourth embodiment. Regarding the process of the fourth embodiment, parts different from the process of the first embodiment illustrated in FIGS. 12 and 13 will be described.

After process the step S414, the determination unit 16 determines whether the RTF is larger than the preset ThR3 (step S415). The ThR3 is an example of a third threshold value. It is assumed that the ThR3 is a value larger than the ThR.

When the RTF is larger than ThR3, it is highly probable that the estimation of the sound source is incorrect. Therefore, when YES in step S415, the determination unit 16 outputs, to the voice recognition unit 15, an instruction to execute a voice recognition again with the language corresponding to the sound source different from the estimated sound source and the voice data (step S416). For example, when the Japanese voice recognition unit 15-1 acquires the first voice data and executes a first voice recognition, the English voice recognition unit 15-2 executes the voice recognition again using the second voice data. When the English voice recognition unit 15-2 acquires the second voice data and executes a first voice recognition, the Japanese voice recognition unit 15-1 executes the voice recognition again using the first voice data.

The sound source direction estimation device 3 stands by until the voice recognition ends. When NO in step S415, or YES in the step S417, the translation unit 18 performs translation process using a process result of the voice recognition unit 15 again (step S418).

When the RTF is larger than the preset ThR3, it is conceivable that the sound source is incorrect and there is a high possibility that the voice recognition is performed in a language that does not correspond to the input voice. In this case, the translation process of the translation unit 18 is not correctly translated, and there is a possibility that a user may make a reword. Therefore, the sound source direction estimation device 3 in the fourth embodiment can improve an accuracy of the voice recognition and translation by re-doing the voice recognition when the RTF is larger than the preset ThR3, and it is also possible to reduce time for rewording.

Figure 22:
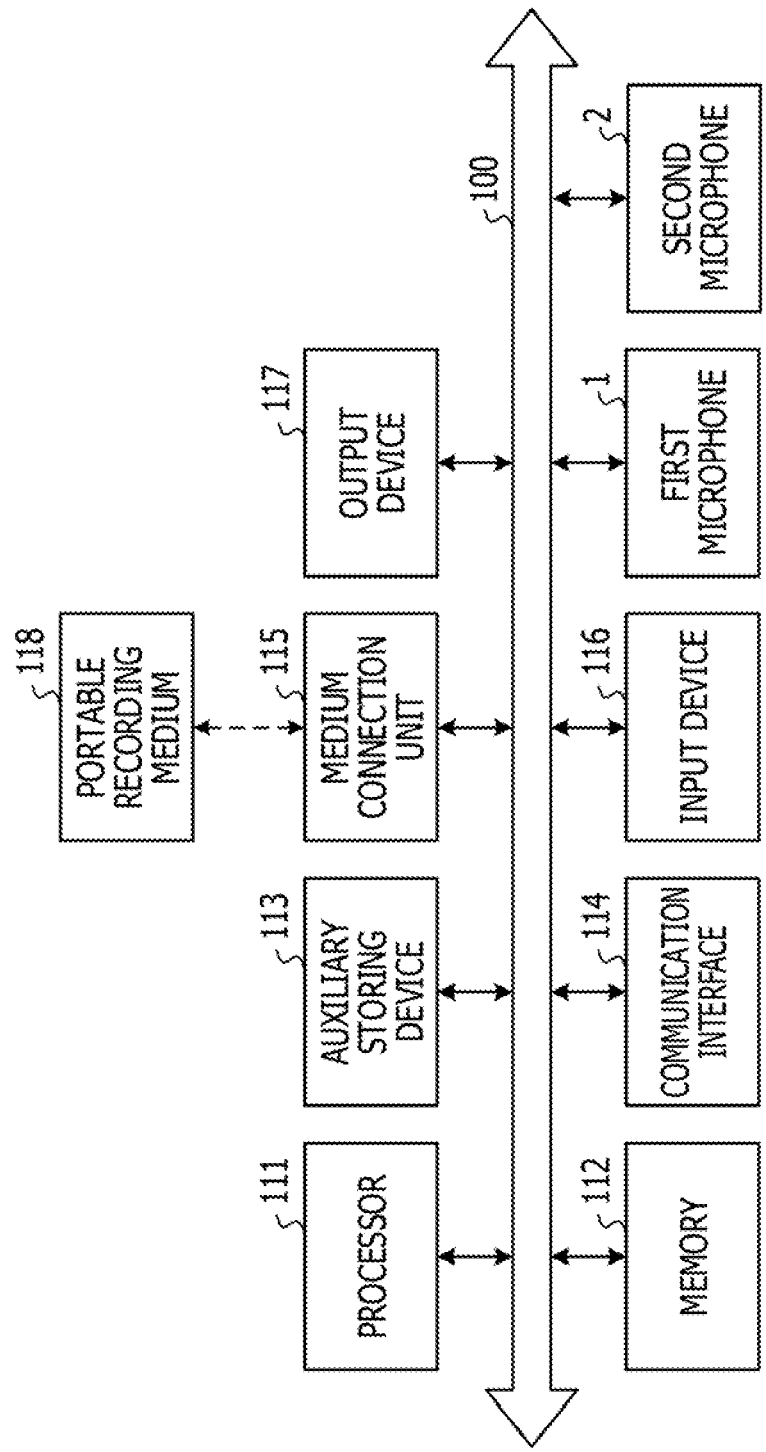
FIG. 22 is a diagram illustrating an example of a hardware configuration of a sound source direction estimation device.

Next, an example of a hardware configuration of the sound source direction estimation device 3 will be described. FIG. 22 is a diagram illustrating an example of a hardware configuration of the sound source direction estimation device 3. As illustrated in the example in FIG. 22, in the sound source direction estimation device 3, the first microphone 1, the second microphone 2, a processor 111, a memory 112, an auxiliary storage device 113, a communication interface 114, a medium connection unit 115, an input device 116, and an output device 117 are connected to a bus 100.

The processor 111 executes a program developed in the memory 112. A sound source estimation program which performs process in the embodiment may be applied to the program to be executed.

The memory 112 is, for example, a random access memory (RAM). The auxiliary storage device 113 is a storage device for storing various information, and for example, a hard disk drive or a semiconductor memory or the like may be applied to the auxiliary storage device 113. The sound source estimation program for performing the process of the embodiment may be stored in the auxiliary storage device 113.

The communication interface 114 is connected to a communication network such as a local area network (LAN) or a wide area network (WAN), and performs a data conversion and the like accompanying communication.

The medium connection unit 115 is an interface to which a portable recording medium 118 can be connected. As the portable recording medium 118, an optical disc (for example, a compact disc (CD) or a digital versatile disc (DVD)), a semiconductor memory, or the like may be applied. The sound source estimation program for performing the process of the embodiment may be stored in the portable recording medium 118.

The input device 116 is, for example, a keyboard, a pointing device, or the like, and receives an input such as an instruction and information from a user.

The output device 7 is, for example, a display device, a printer, a speaker, or the like, and outputs an inquiry or an instruction to the user, a process result, or the like.

The voice storage unit 13 and the storage unit 19 illustrated in FIG. 4 may be realized by the memory 112, the auxiliary storage device 113, the portable recording medium 118, or the like. The utterance detection unit 11, the sound source direction estimation unit 12, the output, unit 14, the voice recognition unit 15, the determination unit 16, the update unit 17 and the translation unit 18 illustrated in FIG. 1 may be realized by the processor 111 executing the sound source estimation program developed in the memory 112.

The memory 112, the auxiliary storage 113, and the portable recording medium 118 are computer readable non-transitory tangible storage media, and not temporary media such as a signal carrier.

Figure 23A:
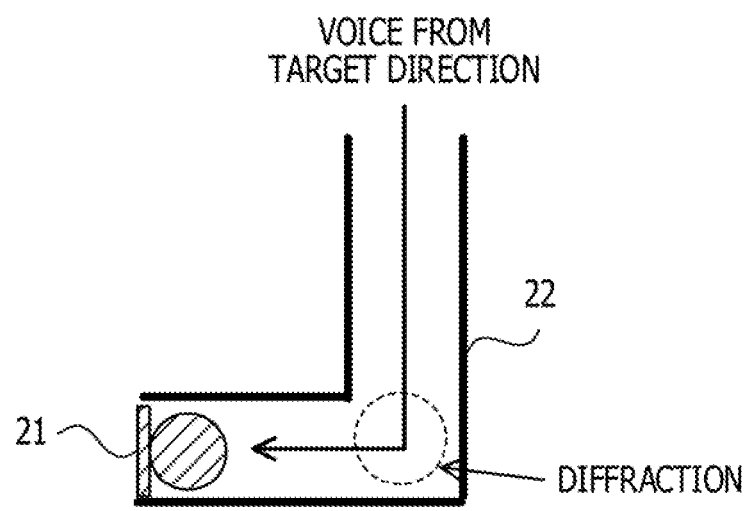
FIGS. 23A and 23B are diagrams illustrating another example of a microphone.
Figure 23B:
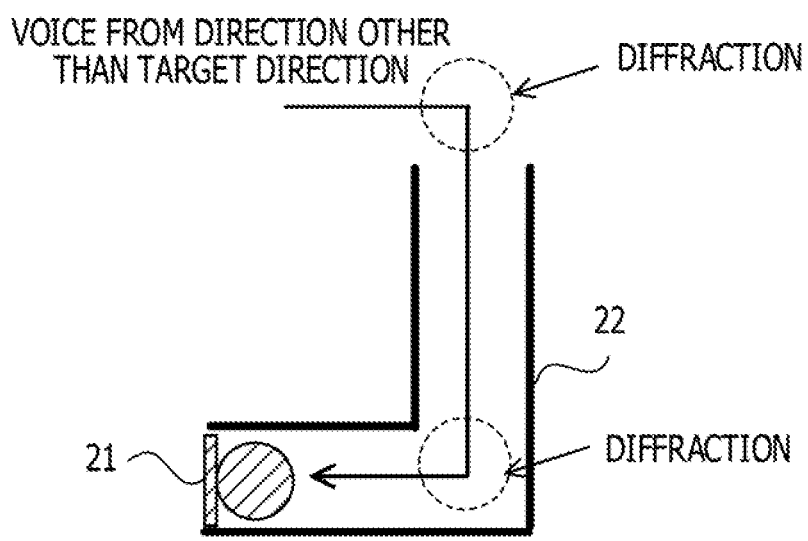

FIGS. 23A and 23B are diagrams illustrating another example of a microphone. In FIGS. 23A and 23B, a non-directional microphone 21 is installed at a bottom of an L-shaped sound path 22. The sound path 22 is installed such that a direction of an entrance (opening portion) of the sound path 22 is a target direction.

When a voice uttered from the target direction as illustrated in FIG. 23A, the voice is diffracted once in the sound path 22 and input to the microphone 21. On the other hand, when a voice is uttered from a direction other than the target direction as illustrated in FIG. 23B, the voice is diffracted twice and input to the microphone 21. With such a structure, a voice from other than the target direction can be attenuated by the diffraction to emphasize directivity to the target direction.

A structure including the microphone 21 and the sound path 22 illustrated in FIGS. 23A and 23B may be applied to the sound source direction estimation device 3 instead of the first microphone 1 and the second microphone 2 described above. In that case, "a directivity of the first microphone 1" in the description of the present embodiment is replaced with "a directivity based on the microphone 21 and the sound path structure in which the microphone 21 is installed". Similarly, "a directivity of the second microphone 2" is replaced with "a directivity based on the microphone 21 and the sound path structure in which the microphone 21 is installed". The direction of directivity based on the sound path structure in which the microphone 21 and the microphone 21 are installed corresponds to the target direction in FIGS. 23A and 23B.

Others

The present embodiment is not limited to the embodiments described above, and various modifications, additions, and omissions can be applied without departing from the scope of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor included in a computer mounted on a sound source direction estimation device to execute a process, the process comprising:
  calculating a sound pressure difference between a first voice data acquired from a first microphone and a second voice data acquired from a second microphone to estimate a sound source direction based on the sound pressure difference between the first voice data and the second voice data;
  estimating, by using the estimated sound source direction, a language from among a plurality of languages each corresponding to a respective individual sound source, the estimated language being a language corresponding to a sound source located in the estimated sound source direction;

outputting an instruction to execute, on at least any one of the first voice data or the second voice data, a voice recognition in the estimated language; and controlling a reference for estimating a sound source direction based on the sound pressure difference, based on a time length of the voice data used for the voice recognition based on the instruction and a voice recognition time length, wherein the process of estimating the sound source direction of the first voice data and the second voice data calculates a sound pressure difference between the first voice data acquired from the first microphone and the second voice data acquired from the second microphone, and estimates the sound source direction of the first voice data and the second voice data based on a comparison result between a first threshold value for determining the sound source direction of the first voice data and the second voice data, and the sound pressure difference, and the process of controlling the reference updates the first threshold value when the voice recognition time length with respect to the time length of the voice data used for the voice recognition based on the instruction, is larger than a second threshold value for determining whether a language of the first voice data or the second voice data to be input to the voice recognition is different from the language corresponding to the sound source direction.

2. The non-transitory computer-readable storage medium according to claim 1, wherein the process of outputting the instruction to execute the voice recognition when the sound pressure difference obtained by subtracting a sound pressure of the second voice data from a sound pressure of the first voice data is equal to or larger than the first threshold value, estimates that a voice is uttered from a first sound source present in a direction according to a directivity of the first microphone or a directivity based on the first microphone and a sound path structure where the first microphone is installed, and outputs the instruction to execute the voice recognition in a language corresponding to the first sound source on the first voice data, and when the sound pressure difference is less than the first threshold value, estimates that a voice is uttered from a second sound source present in a direction according to a directivity of the second microphone or a directivity based on the second microphone and a sound path structure where the second microphone is installed, and outputs the instruction to execute the voice recognition in a language corresponding to the second sound source on the second voice data.

3. The non-transitory computer-readable storage medium according to claim 1, wherein the process of controlling the reference increases the first threshold value when the sound pressure difference obtained by subtracting a sound pressure of the second voice data from a sound pressure of the first voice data is equal to or larger than the first threshold value and the voice recognition time length with respect to the time length of the voice data used for the voice recognition is larger than the second threshold value, and decreases the first threshold value when the sound pressure difference is less than the first threshold value and the voice recognition time length with respect to the time length of the voice data used for the voice recognition is larger than the second threshold value.

4. The non-transitory computer-readable storage medium according to claim 1, wherein the process of controlling the reference calculates the sound pressure difference for a plurality of frames, and updates the first threshold value based on an average value of the calculated sound pressure differences for the plurality of frames.

5. The non-transitory computer-readable storage medium according to claim 1, wherein the process of controlling the reference updates the first threshold value so that a difference between the sound pressure difference and the first threshold value becomes large when the voice recognition time length with respect to the time length of the voice data used for the voice recognition is equal to or less than the second threshold value, and the difference between the sound pressure difference and the first threshold value is equal to or less than a predetermined value.

6. The non-transitory computer-readable storage medium according to claim 1, wherein the process of outputting the instruction to execute the voice recognition outputs the instruction to execute the voice recognition in a language corresponding to a sound source different from the estimated sound source when the voice recognition time length with respect to the time length of the voice data used for the voice recognition is larger than a third threshold value which is equal to or larger than the second threshold value.

7. The non-transitory computer-readable storage medium according to claim 1, wherein the process of controlling the reference sets the first threshold value based on a difference between the sound pressure differences under a plurality of noise conditions.

8. A sound source direction estimation method comprising:

calculating a sound pressure difference between a first voice data acquired from a first microphone and a second voice data acquired from a second microphone to estimate a sound source direction based on the sound pressure difference between the first voice data and the second voice data;

estimating, by using the estimated sound source direction, a language from among a plurality of languages each corresponding to a respective individual sound source, the estimated language being a language corresponding to a sound source located in the estimated sound source direction;

outputting an instruction to execute, on at least any one of the first voice data or the second voice data, a voice recognition in the estimated language; and controlling a reference for estimating a sound source direction based on the sound pressure difference, based on a time length of the voice data used for the voice recognition based on the instruction and a voice recognition time length, wherein the process of estimating the sound source direction of the first voice data and the second voice data calculates the sound pressure difference between the first voice data acquired from the first microphone and the second voice data acquired from the second microphone, and estimates the sound source direction of the first voice data and the second voice data based on a comparison result between a first threshold value for determining the sound source direction of the first voice data and the second voice data, and the sound pressure difference, and the process of controlling the reference updates the first threshold value when the voice recognition time length with respect to the time length of the voice data used for the voice recognition based on the instruction, is larger than a second threshold value for determining whether a language of the first voice data or the second voice data to be input to the voice recognition is different from the language corresponding to the sound source direction.

9. A sound source direction estimation device comprising:
a memory; and
a processor coupled to the memory and configured to:
calculate a sound pressure difference between a first voice data acquired from a first microphone and a second voice data acquired from a second microphone to estimate a sound source direction based on the sound pressure difference between the first voice data and the second voice data;
estimate, by using the estimated sound source direction, a language from among a plurality of languages each corresponding to a respective individual sound source, the estimated language being a language corresponding to a sound source located in the estimated sound source direction;

output an instruction to execute, on at least any one of the first voice data or the second voice data, a voice recognition in the estimated language; and control a reference for estimating a sound source direction based on the sound pressure difference, based on a time length of the voice data used for the voice recognition based on the instruction and a voice recognition time length, wherein the processor calculates the sound pressure difference between the first voice data acquired from the first microphone and the second voice data acquired from the second microphone, and estimates a sound source direction of the first voice data and the second voice data based on a comparison result between a first threshold value for determining the sound source direction of the first voice data and the second voice data, and the sound pressure difference, and updates the first threshold value when the voice recognition time length with respect to the time length of the voice data used for the voice recognition based on the instruction, is larger than a second threshold value for determining whether a language of the first voice data or the second voice data to be input to the voice recognition is different from the language corresponding to the sound source direction.

\* \* \* \* \*